United States Patent
Matsumoto et al.

(10) Patent No.: US 12,473,657 B2
(45) Date of Patent: Nov. 18, 2025

(54) LIGHT-DRIVEN FUEL CELL, CATHODE CATALYST FOR SAME, ANODE CATALYST FOR SAME, AND METHANOL PRODUCTION METHOD COMPRISING CONVERTING METHANE INTO METHANOL

(71) Applicant: JAPAN SCIENCE AND TECHNOLOGY AGENCY, Kawaguchi (JP)

(72) Inventors: Takahiro Matsumoto, Fukuoka (JP); Masato Murakami, Fukuoka (JP); Tatsuya Nakano, Fukuoka (JP); Ryo Nishikawa, Fukuoka (JP); Kento Kimura, Fukuoka (JP); Kou Sameshima, Fukuoka (JP)

(73) Assignee: JAPAN SCIENCE AND TECHNOLOGY AGENCY, Kawaguchi (JP)

(*) Notice: Subject to any disclaimer, the term of this patent is extended or adjusted under 35 U.S.C. 154(b) by 413 days.

(21) Appl. No.: 17/923,625

(22) PCT Filed: May 13, 2021

(86) PCT No.: PCT/JP2021/018285
§ 371 (c)(1),
(2) Date: Nov. 7, 2022

(87) PCT Pub. No.: WO2021/235326
PCT Pub. Date: Nov. 25, 2021

(65) Prior Publication Data
US 2023/0193489 A1 Jun. 22, 2023

(30) Foreign Application Priority Data
May 21, 2020 (JP) ................. 2020-089162

(51) Int. Cl.
C25B 11/087 (2021.01)
C25B 3/07 (2021.01)
(Continued)

(52) U.S. Cl.
CPC .............. C25B 11/087 (2021.01); C25B 3/07 (2021.01); C25B 3/21 (2021.01); C25B 3/23 (2021.01);
(Continued)

(58) Field of Classification Search
CPC ... C25B 11/052; C25B 11/081; C25B 11/085; C25B 11/087; C25B 3/07; C25B 3/21;
(Continued)

(56) References Cited

U.S. PATENT DOCUMENTS

| | | |
|---|---|---|
| 3,533,765 A | 10/1970 | Felt et al. |
| 2006/0292418 A1* | 12/2006 | Akiyama ............ H01M 8/0687 429/513 |

(Continued)

FOREIGN PATENT DOCUMENTS

| | | |
|---|---|---|
| JP | 2003132930 A | 5/2003 |
| JP | 2006513145 A | 4/2006 |

(Continued)

OTHER PUBLICATIONS

Fujita et al (dppm and hydrido-bridged dinuclear complexes of iridium. Synthesis and structures of [(IrCp*)2(µ-dppm)(µ-H)(µ-X)]2+ (X Cl, OMe, OH, or H), Journal of the Chemical Society, Dalton Transactions, 12 (2000) 1931-1936). (Year: 2000).*

(Continued)

*Primary Examiner* — Joshua L Allen
(74) *Attorney, Agent, or Firm* — Panitch Schwarze Belisario & Nadel LLP

(57) ABSTRACT

A light-driven fuel cell includes a cathode, an anode, and a proton-permeable membrane between the anode and the
(Continued)

cathode. The anode includes a photocatalyst for anaerobic methane oxidation reaction, and when the anode is supplied with methane and water and is irradiated with light, methanol, protons and electrons are generated by anaerobic methane oxidation reaction from the methane and the water supplied to the anode; the protons pass through the proton-permeable membrane and move to the cathode; and the electrons move to the cathode via an external circuit. The cathode includes a photocatalyst for aerobic methane oxidation reaction, and when the cathode is supplied with methane and oxygen and is irradiated with light, methanol and water are generated by aerobic methane oxidation reaction from the methane and the oxygen supplied to the cathode and the protons and the electrons moved from the anode.

8 Claims, 6 Drawing Sheets

(51) Int. Cl.

| | | |
|---|---|---|
| *C25B 3/21* | (2021.01) | |
| *C25B 3/23* | (2021.01) | |
| *C25B 9/19* | (2021.01) | |
| *C25B 11/081* | (2021.01) | |
| *C25B 11/085* | (2021.01) | |
| *C25B 13/04* | (2021.01) | |
| *H01M 8/22* | (2006.01) | |
| *H01M 16/00* | (2006.01) | |

(52) U.S. Cl.
CPC .............. *C25B 9/19* (2021.01); *C25B 11/081* (2021.01); *C25B 11/085* (2021.01); *C25B 13/04* (2013.01); *H01M 8/22* (2013.01); *H01M 16/003* (2013.01)

(58) Field of Classification Search
CPC .... C25B 3/23; C25B 9/19; C25B 9/23; C25B 13/04; C25B 5/00; H01M 8/22; H01M 16/003; H01M 4/9008; B01J 35/39; C07F 15/0033; C07F 15/0046; Y02E 60/50; Y02P 20/52; Y02P 70/50
See application file for complete search history.

(56) References Cited

U.S. PATENT DOCUMENTS

| | | | | |
|---|---|---|---|---|
| 2009/0325024 A1* | 12/2009 | Hung | ................. | H01M 8/0204 429/435 |
| 2012/0321550 A1 | 12/2012 | Fukuzumi et al. | | |
| 2013/0075386 A1 | 3/2013 | Chang et al. | | |
| 2019/0134609 A1* | 5/2019 | Yamauchi | ................. | C25B 3/25 |

FOREIGN PATENT DOCUMENTS

| | | |
|---|---|---|
| JP | 2010-007152 A | 1/2010 |
| JP | 2010083730 A | 4/2010 |
| JP | 2011-082144 A | 4/2011 |
| JP | 2015149247 A | 8/2015 |
| JP | 2018192409 A | 12/2018 |
| JP | 2019-006741 A | 1/2019 |
| JP | 2019-209259 A | 12/2019 |
| WO | 2004024708 A2 | 3/2004 |
| WO | 2011108730 A1 | 9/2011 |

OTHER PUBLICATIONS

Joglekar et al. (M Joglekar, et al. Organometallic complexes anchored to conductive carbon for electrocatalytic oxidation of methane at low temperature, J. Am. Chem. Soc. 138 (2016) 116-125). (Year: 2015).*
Ball, R.G., et al., "Synthesis and Structure of [(η-C5Me5)Ir(CO)]2", Inorg. Chem., Oct. 3, 1989 (received date), vol. 29, pp. 2023-2025, American Chemical Society. (3 pages).
Fagan, Paul J., et al., "Molecular Engineering of Solid-State Materials: Organometallic Building Blocks", J. Am. Chem. Soc., May 24, 1988 (received date), vol. 111, pp. 1698-1719, American Chemical Society. (22 pages).
International Search Report (PCT/ISA/210) with an English translation, and Written Opinion (PCT/ISA/237) mailed on Aug. 3, 2021, by the Japanese Patent Office as the International Searching Authority for International Application No. PCT/JP2021/018285. (10 pages).
Kang, J.W., et al., "Pentamethylcyclopentadienylrhodium and -iridium Halides, I. Synthesis and Properties", J. Am. Chem. Soc., Apr. 15, 1969 (received date), vol. 91, Issue 22, pp. 5970-5977. (8 pages).
Nemoto, Junichi, et al., "Biophotofuel cell (BPFC) generating electrical power directly from aqueous solutions of biomass and its related compounds while photodecomposing and cleaning", J. Appl. Electrochem., Nov. 20, 2007 (received date), vol. 37, pp. 1039-1046, Springer Science+Business Media B.V. (8 pages).
Chen et al., "From Solar Energy to Fuels: Recent Advances in Light-Driven C1 Chemistry," Angewandte Chemie International Edition, Verlag Chemie, Hoboken, USA, vol. 58, No. 49, pp. 17528-17551 (Sep. 13, 2019). Cited in Search Report issued Dec. 23, 2024, in counterpart European Patent Application No. 21808492. 9).
Fujita et al., "DPPM and Hydrido-Bridged Dinuclear Complexes of Iridium. Synthesis and Structures of (IRCP*)2(MU-DPPM)(MU-H)(MU-X)3?42+ (X=Cl, OMe, OH, OR H)," Journal of the Chemical Society, Dalton Transactions, Chemical Society. Letchworth, GB, No. 12, pp. 1931-1936 (Jan. 1, 2000). Cited in Search Report issued Dec. 23, 2024, in counterpart European Patent Application No. 21808492.9).
Habisreutinger et al., "Photocatalytic Reduction of CO2 on TiO2 and Other Semiconductors," Angewandte Chemie International Edition, Verlag Chemie, Hoboken, USA, vol. 52, No. 29, pp. 7372-7408 (Jun. 13, 2013). Cited in Search Report issued Dec. 23, 2024, in counterpart European Patent Application No. 21808492.9).
Schlaf et al., "Catalytic Deoxygenation of 1,2-Propanediol to Give n-Propanol," Advanced Synthesis and Catalysis, John Wiley & Sons, Inc, Hoboken, USA, vol. 351, No. 5, pp. 789-800 (Mar. 23, 2009). Cited in Search Report issued Dec. 23, 2024, in counterpart European Patent Application No. 21808492.9).

\* cited by examiner $C_6H_{12}O_6 + 6H_2O + UV\ light \rightarrow Photocurrents + 6CO_2 + 24\ H^+$

LIGHT-DRIVEN FUEL CELL, CATHODE CATALYST FOR SAME, ANODE CATALYST FOR SAME, AND METHANOL PRODUCTION METHOD COMPRISING CONVERTING METHANE INTO METHANOL

FIELD

The present invention relates to a light-driven fuel cell, a catalyst for a cathode thereof, a catalyst for an anode thereof, and a method for producing methanol comprising a step of converting methane to methanol.

BACKGROUND

Conventionally, fuel cells, such as solid-polymer fuel cells, alkaline electrolyte fuel cells, phosphoric acid fuel cells, molten carbonate fuel cells, and solid oxide fuel cells, have been developed and put into practical use. Furthermore, recently, a fuel cell using a photocatalyst (light-driven fuel cell) has been proposed. The light-driven fuel cell requires irradiation of light to an anode, and, as a fuel, an organic compound and/or a nitrogen-containing compound contained in biomass, waste, etc., can be used. For this reason, the light-driven fuel cell is advantageous over conventional fuel cells in that they can make effective use of resources.

Non-Patent Document 1 describes a fuel cell using a thin layer of titanium dioxide as an anode and platinum as a cathode, wherein glucose is photocatalytically oxidized on the titanium dioxide electrode, and generated electrons are extracted to an external circuit, thereby generating electrical power (see FIG. 1).

CITATION LIST

Non-Patent Literature

[Non-Patent Document 1] J. Appl. Electrochem., 37, 1039 (2007)

SUMMARY

Technical Problem

Conventional light-driven fuel cells have insufficient power generation characteristics.

Accordingly, an object of the present invention is to provide a light-driven fuel cell having excellent power generation characteristics.

Solution to Problem

In order to achieve the above objective, the light-driven fuel cell according to the present invention has the following characteristics:

[1] A light-driven fuel cell comprising a cathode, an anode, and a proton-permeable membrane between the cathode and the anode, wherein the anode comprises a photocatalyst for anaerobic methane oxidation reaction, and when the anode is supplied with methane and water and is irradiated with light, methanol, protons and electrons are generated by anaerobic methane oxidation reaction from the methane and the water supplied to the anode; the protons pass through the proton-permeable membrane and move to the cathode; and the electrons move to the cathode via an external circuit, and the cathode comprises a photocatalyst for aerobic methane oxidation reaction, and when the cathode is supplied with methane and oxygen and is irradiated with light, methanol and water are generated by aerobic methane oxidation reaction from the methane and the oxygen supplied to the cathode and the protons and the electrons moved from the anode.

Further, the present invention includes the following inventions:

[2] The light-driven fuel cell according to [1], wherein the photocatalyst for anaerobic methane oxidation reaction comprises an organometallic complex.

[3] The light-driven fuel cell according to [2], wherein the organometallic complex comprised in the photocatalyst for anaerobic methane oxidation reaction has pentamethylcyclopentadiene as a ligand and iridium as a metal center.

[4] The light-driven fuel cell according to [2], wherein the organometallic complex comprised in the photocatalyst for anaerobic methane oxidation reaction has cyclopentadiene as a ligand and manganese or iron as a metal center.

[5] The light-driven fuel cell according to one of [1] to [4], wherein the photocatalyst for aerobic methane oxidation reaction comprises an organometallic complex.

[6] The light-driven fuel cell according to [5], wherein the organometallic complex comprised in the photocatalyst for aerobic methane oxidation reaction has pentamethylcyclopentadiene as a ligand and ruthenium as a metal center.

[7] The light-driven fuel cell according to one of [1] to [6], comprising an anode-side light-transmitting substrate and a cathode-side light-transmitting substrate which are at least partially light-transmitting, wherein
the anode is situated between the anode-side light-transmitting substrate and the proton-permeable membrane, and/or the cathode is situated between the cathode-side light-transmitting substrate and the proton-permeable membrane.

[8] The light-driven fuel cell according to [7], wherein
(1) the cathode comprises a layer comprising the photocatalyst for aerobic methane oxidation reaction and a cathode-side gas diffusion layer,
(2) the anode comprises a layer comprising the photocatalyst for anaerobic methane oxidation reaction and an anode-side gas diffusion layer,
(3) the cathode-side gas diffusion layer is arranged facing the cathode-side light-transmitting substrate; the anode-side gas diffusion layer is arranged facing the anode-side light-transmitting substrate; the layer comprising the photocatalyst for aerobic methane oxidation reaction is arranged facing the cathode-side membrane face of the proton-permeable membrane; and the layer comprising the photocatalyst for anaerobic methane oxidation reaction is arranged facing an anode-side membrane face of the proton-permeable membrane.

[9] A photocatalyst for anaerobic methane oxidation reaction comprising an organometallic complex, wherein the organometallic complex has pentamethylcyclopentadiene as a ligand and iridium as a metal center.

[10] A photocatalyst for anaerobic methane oxidation reaction comprising an organometallic complex, wherein the organometallic complex has cyclopentadiene as a ligand and manganese or iron as a metal center.

[11] A method for producing methanol, comprising:
bringing the photocatalyst for anaerobic methane oxidation reaction according to [9] or [10] into contact with methane and water.

[12] A photocatalyst for aerobic methane oxidation reaction comprising an organometallic complex, wherein the organometallic complex has pentamethylcyclopentadiene as a ligand and ruthenium as a metal center.

[13] A method for producing methanol, comprising:
bringing the photocatalyst for aerobic methane oxidation reaction according to into contact with methane and oxygen.

Advantageous Effects of Invention

According to the present invention, it is possible to provide a light-driven fuel cell having excellent power generation properties.

Further, according to the present invention, it is possible to provide a compact light-driven fuel cell which does not require a desulfurizer, a reformer, a CO converter, a steam separator, etc. Further, according to the present invention, it is possible to provide a catalyst for a cathode of a light-driven fuel cell, a catalyst for an anode of a light-driven fuel cell, and a methanol production method comprising converting methane into methanol.

DESCRIPTION OF EMBODIMENTS

Figure 1:
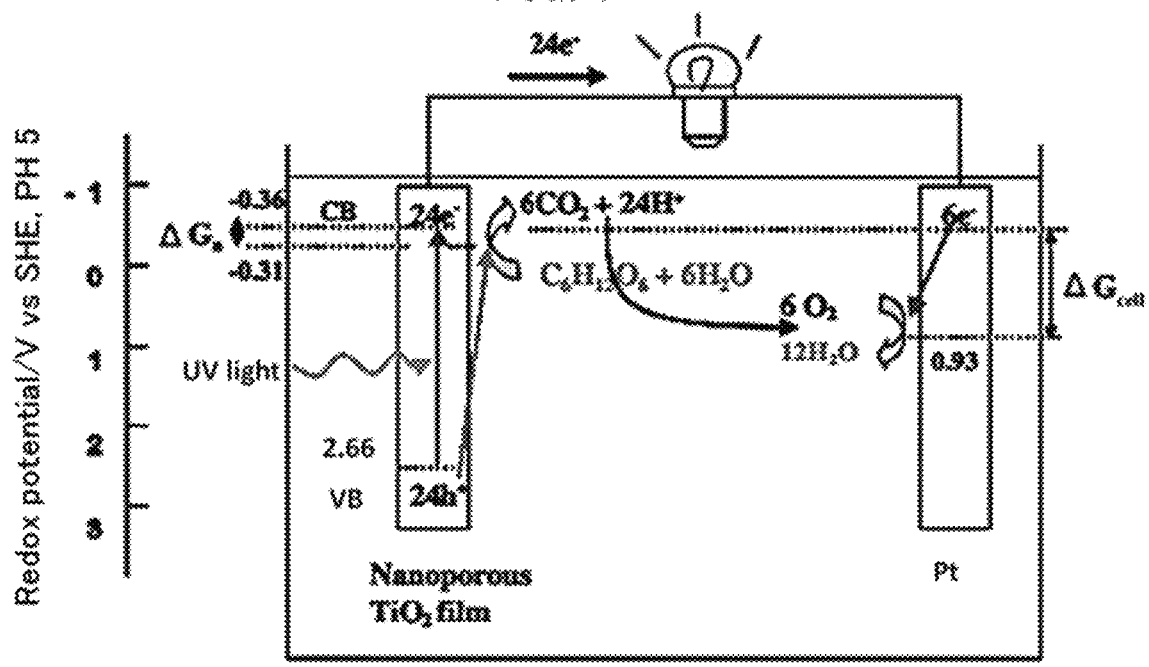
FIG. 1 is a conceptual diagram showing a power generation mechanism of a dye-sensitized solar cell according to the prior art.
Figure 1:
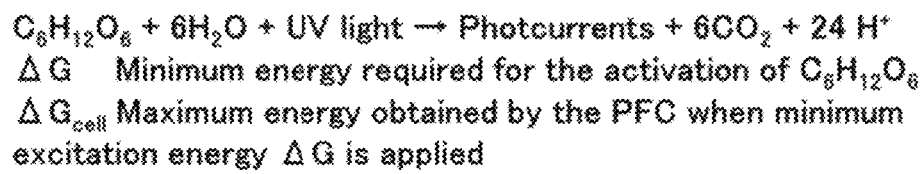
Figure 2:
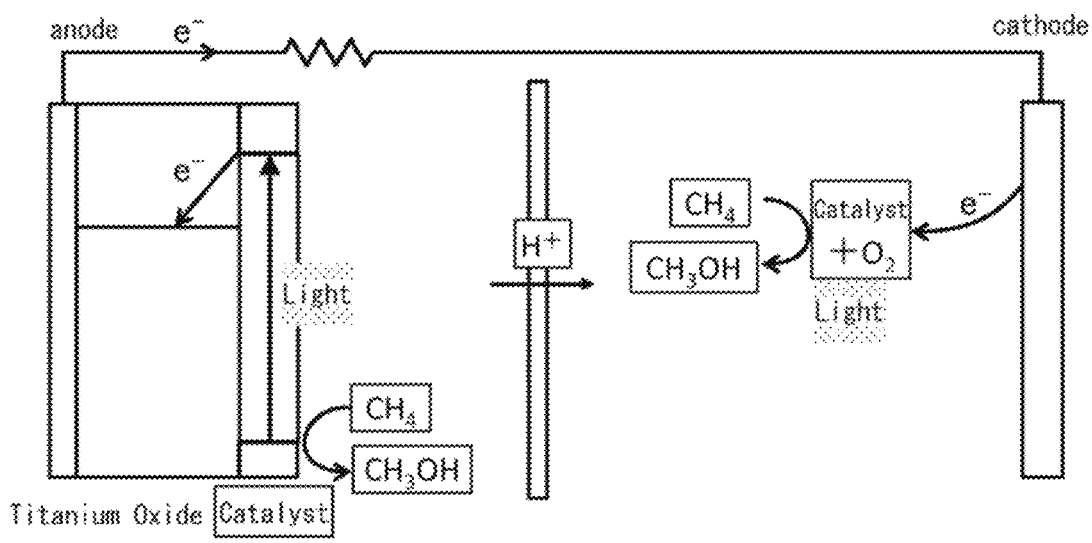
FIG. 2 is a conceptual diagram showing a power generation mechanism according to the present invention.

To achieve the above objective, the present inventors have conducted a series of studies, and found that the power generation characteristics of the conventional light-driven fuel cell is not sufficient since the efficiency of the electron generation at the anode side and the electron exchange at the cathode side are not sufficient. Based on this finding, in order to improve the efficiency of the electron generation at the anode side and the electron exchange at the cathode side, the present inventors have conceived of using a system in which protons generated at an anode by an anaerobic methane oxidation reaction pass through a proton-permeable membrane so as to move from the anode to a cathode; electrons generated at the anode by the anaerobic methane oxidation reaction involving a photocatalyst for anaerobic methane oxidation reaction move from the anode to the cathode via an external circuit; and an redox reaction occurs at the cathode wherein oxygen is reduced by the electrons moved from the anode in the presence of the protons moved from the anode, and wherein this redox reaction is an aerobic methane oxidation reaction by a photocatalyst for aerobic methane oxidation reaction at the cathode (refer to FIG. 2). In the system illustrated in FIG. 2, the electromotive force is generated from the difference between the "oxidation potential of the electron charge of titanium oxide" and the "reduction potential of the oxidative addition complex (complex +$O_2$)".

Figure 3:
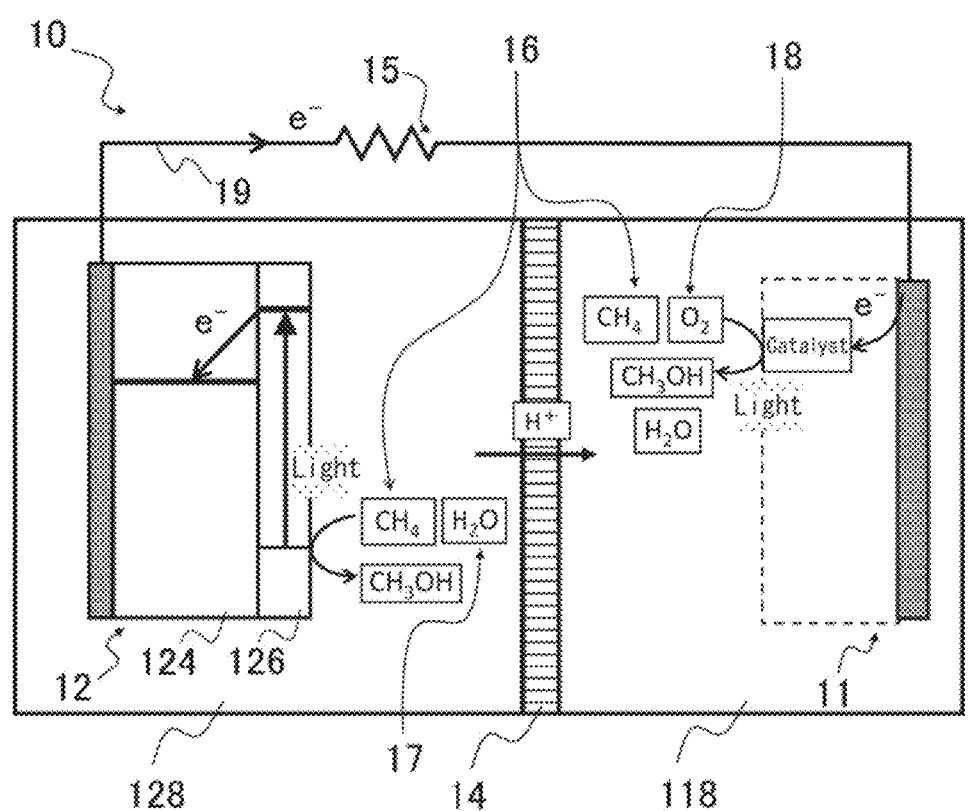
FIG. 3 is a schematic diagram showing the structure of the light-driven fuel cell according to one embodiment of the present invention and material conversions therein.

Based on this idea, the present inventors have conducted further research, and have found the following and conceived of the present invention: in a dual reaction field structure which is compartmentalized into an anode and a cathode by a proton-permeable membrane, when an anaerobic methane oxidation reaction is induced by using methane and water supplied to the anode under the light irradiation, an efficiency of electron generation at the anode can be improved, and when an aerobic methane oxidation reaction is induced by using methane and oxygen supplied to the cathode under the light irradiation, an efficiency of electron exchange at the cathode can be improved, and as a result, a power generation characteristic can be improved significantly (see FIG. 3).

With regard to the excellent power generation characteristics of the light-driven fuel cell of the present invention, a speculative mechanism thereof is as follows, which is based on a mechanism in which a catalyst reaction cycle described below and a catalyst activation/regeneration cycle described below are combined.

First, the catalyst reaction cycle is explained: A system involved in the catalyst reaction cycle includes, for example, a system consisting of a catalyst reaction cycle based on an anaerobic methane oxidation reaction at an anode and a catalyst reaction cycle based on an aerobic methane oxidation reaction at a cathode, such as a "mechanism represented by the general formula" (in the formula, M represents a metal and L represents a ligand) shown in the following formula (1).

[Chem 1]

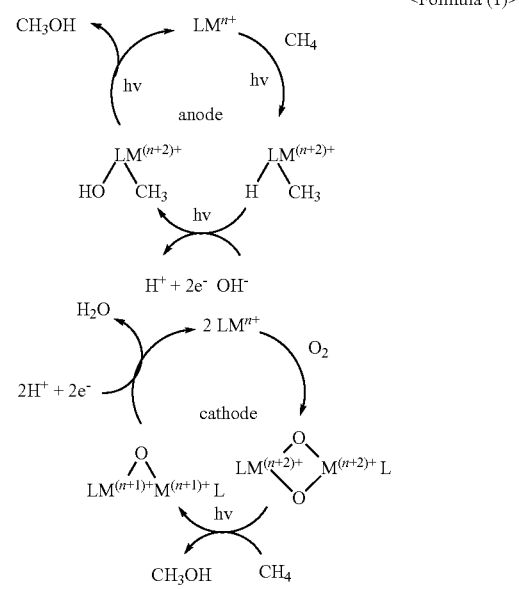

<Formula (1)>

Next, the catalyst activation/regeneration cycle is explained: A system involved in the catalyst activation/regeneration cycle includes, for example, as in a "specific mechanism" shown in the following formula (2), a system consisting of a catalyst activation/regeneration cycle of an organometallic complex comprised in a photocatalyst for anaerobic methane oxidation reaction at an anode (for example, an embodiment in which a ligand constituting the organometallic complex comprises pentamethylcyclopentadiene and a transition metal serving as a metal center in the organometallic complex is monovalent iridium, or an embodiment in which a ligand constituting the organometallic complex comprises cyclopentadiene and a transition metal serving as a metal center in the organometallic complex is monovalent iron or monovalent manganese) and a catalyst activation/regeneration cycle of an organometallic complex contained in a photocatalyst for aerobic methane oxidation reaction at a cathode (for example, an embodiment in which a ligand constituting the organometallic complex comprises pentamethylcyclopentadiene and a transition metal serving as a metal center in the organometallic complex is tetravalent ruthenium).

[Chem 2]

<Formula (2)>

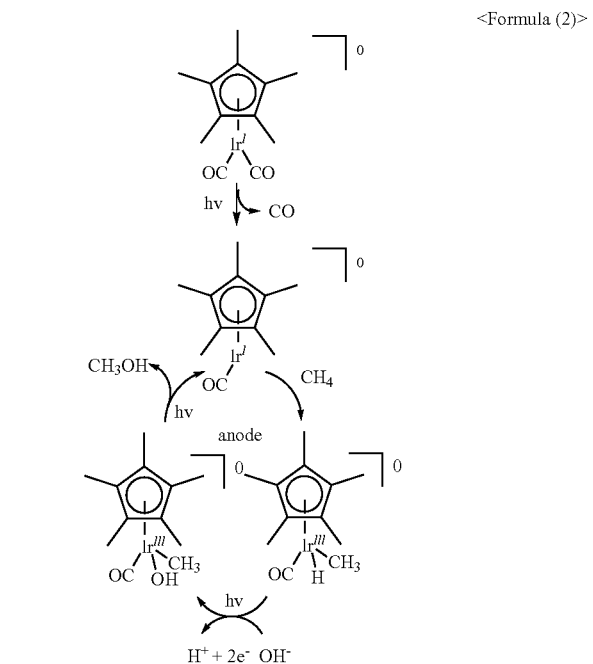

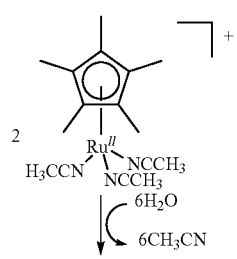

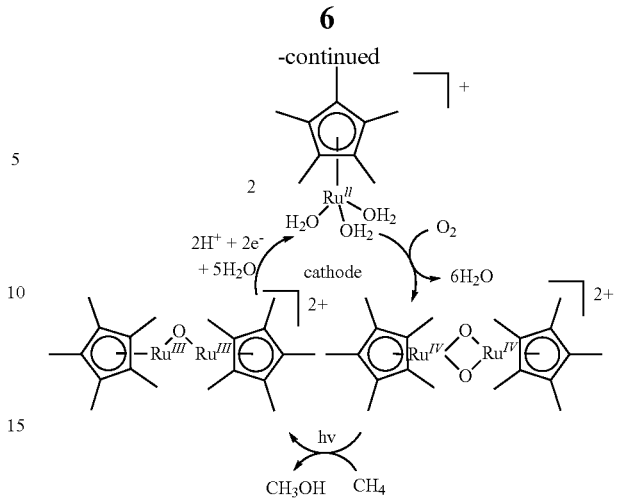

It is presumed that the efficiency of electron generation and the efficiency of electron exchange can be simultaneously improved by the mechanism as described above. Note that the mechanism described above is speculation and does not limit the present invention in any way.

<<Light-Driven Fuel Cell>>

The light-driven fuel cell according to the present disclosure comprises a cathode, an anode, and a proton-permeable membrane between the cathode and the anode, wherein the anode comprises a photocatalyst for anaerobic methane oxidation reaction, and when the anode is supplied with methane and water and is irradiated with light, methanol, protons and electrons are generated from the methane and the water supplied to the anode by anaerobic methane oxidation reaction, the protons pass through the proton-permeable membrane and move to the cathode, and the electrons move to the cathode via an external circuit, and wherein the cathode comprises a photocatalyst for aerobic methane oxidation reaction, and when the cathode is supplied with methane and oxygen and is irradiated with light, methanol and water are generated from the methane and the oxygen supplied to the cathode and the protons and the electrons moved from the anode by aerobic methane oxidation reaction.

Hereinafter, the light-driven fuel cell of the present invention will be described in detail with reference to the drawings. It should be noted that the light-driven fuel cell of the present invention is not limited by the following description.

<<Light-Driven Fuel Cell>>

FIG. 3 is a schematic diagram showing an example of the configuration of the light-driven fuel cell of the present invention. In FIG. 3, for simplicity, size, ratio, etc., of each component may be different from the actual size, ratio, etc. As shown in the figure, the light-driven fuel cell 10 includes a cathode 11, an anode 12, and a proton-permeable membrane 14 between the cathode 11 and the anode 12. The cathode 11 and the anode 12 are electrically connected via an external circuit 15. Methane 16 and water 17 are supplied to the anode 12. Methane 16 and oxygen 18 are supplied to the cathode 11.

The anode 12 of the light-driven fuel cell of FIG. 3 comprises an electrode material 124, such as titanium oxide, and a photocatalyst 126 for anaerobic methane oxidation reaction. By supplying methane and water to the anode 12 and irradiating the anode 12 with light, methanol, protons, and electrons are generated from the methane and the water supplied to the anode by an anaerobic methane oxidation reaction. The protons thus generated pass through the proton-permeable membrane 14 and move to the cathode 11, and the electrons move to the cathode 11 via the external circuit 15.

The cathode 11 of the light-driven fuel cell of FIG. 3 has a photocatalyst for aerobic methane oxidation reaction. By supplying methane and oxygen to the cathode 11 and irradiating light to the cathode 11, methanol and water are generated from the methane and the oxygen supplied to the cathode 11 and the protons and the electrons moved from the anode 12, by an aerobic methane oxidation reaction.

A cathode reaction field 118 in which the aerobic methane oxidation reaction occurs and an anode reaction field 128 in which the anaerobic methane oxidation reaction occurs are separated from each other via a proton-permeable membrane, so that two reaction fields are formed.

A method for generating electrical power by the light-driven fuel cell of the present invention will be described in more detail in the following. It should be noted that the method for generating electrical power by the light-driven fuel cell of the present invention is not limited thereto.

To an anode 12 comprising a photocatalyst for anaerobic methane oxidation reaction, light having an energy equal to or higher than a band gap of the photocatalyst is irradiated. As a result, electrons in the valence band of the photocatalyst contained in the anode 12 are excited to the conduction band, and holes (h+) are generated in the valence band. The holes (h+), which reach the interface of methane, oxidize methane to methanol in the presence of water, in order to generate protons (H+). Further, the excited electrons move along the potential gradient generated in the conduction band and reach the cathode 11 through an external conductor, thereby photocurrent is generated in the external circuit 15.

The reaction at the anode side is shown in equation (II) below:

$$CH_4 + H_2O \rightarrow CH_3OH + 2H^+ + 2e^- \quad (II)$$

To the cathode 11 comprising a photocatalyst for aerobic methane oxidation reaction, light having an energy equal to or higher than a band gap of the photocatalyst is irradiated. As a result, electrons in the valence band of the photocatalyst contained in the cathode 11 are excited to the conduction band, and holes (h+) are generated in the valence band. The holes (h+) thus generated reach the interface of methane 16. On the other hand, protons (H+) generated at the anode 12 pass through the proton-permeable membrane 14 and move to the cathode 11, so that they are supplied to the cathode 11. In this way, methane is oxidized to methanol, in the presence of holes (h+) reaching the interface of methane 16 and protons (H+) supplied to the cathode 11, as well as in the presence of oxygen. At the same time, electrons generated at the anode 12 move to the cathode 11 via the external circuit 15, and the oxygen is reduced to water by the electrons reached the cathode 11. Thus, a redox reaction at the side of the cathode 11 is realized, wherein the protons (H+) at the cathode 11 decreases due to the redox reaction.

The reaction at the cathode side is shown in formula (III) below:

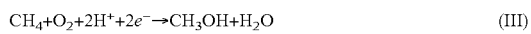

$$CH_4 + O_2 + 2H^+ + 2e^- \rightarrow CH_3OH + H_2O \quad (III)$$

Figure 4:
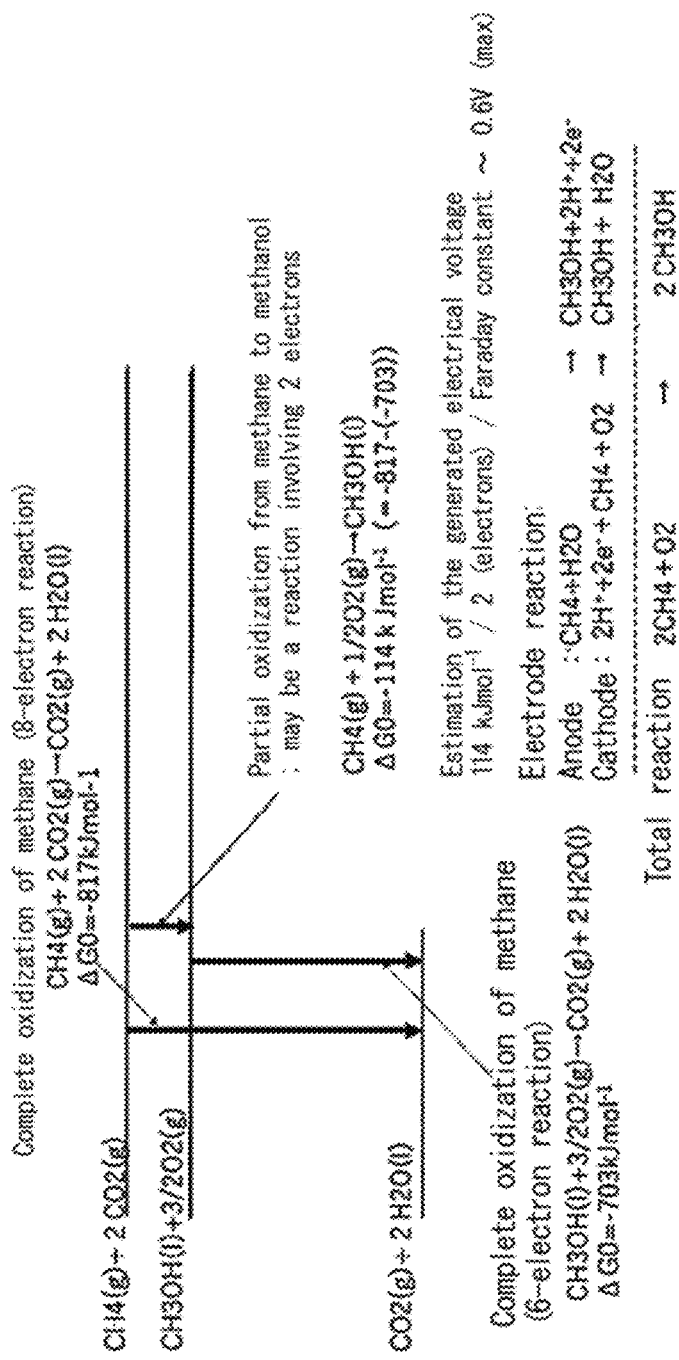
FIG. 4 is a conceptual diagram showing an energy diagram of the present invention.

In the light-driven fuel cell of the present invention, a complete circuit is thus realized, and stable generation of a photocurrent is enabled. FIG. 4 shows a conceptual diagram of an energy diagram of the present invention.

In an exemplary embodiment shown in FIG. 3, the cathode reaction field 118 and the anode reaction field 128 are compartmentalized by the proton-permeable membrane 14 so that they have the same size. However, the proton-permeable membrane 14 may be located closer to the cathode 11 or may be located closer to the anode 12, so that the sizes of the cathode reaction field 118 and the anode reaction field 128 are different from each other. Although one cathode 11 and one anode 12 are provided in the example shown in FIG. 3, a plurality of cathodes 11 and/or anodes 12 may be provided.

The light-driven fuel cell of the present invention may comprise mechanism(s), such as a mechanism for supplying methane 16 to the cathode 11 and the anode 12, a mechanism for supplying water 17 to the anode 12, a mechanism for supplying oxygen 18 to the cathode 11, and/or a mechanism for removing or recovering heat of oxidation reaction. Further, methane supplied to the cathode 11 and the anode 12 may be recycled. As the mechanism for supplying methane to the cathode 11 and the anode 12, mention may be made of a device capable of supplying methane into a solvent as a minute bubble, such as an air diffuser tube. In order to maintain high concentration of methane in each chamber, there may be provided a device capable of injecting methane into the cathode reaction field 118 and anode reaction field 128, particularly a device capable of injecting methane into the cathode 11 and anode 12.

Further, it is preferable that dissolved oxygen is removed in methane 16. Removal of dissolved oxygen is carried out, for example, by inert gas purging using a means for introducing inert gas to an anode. The inert gas purging is not limited thereto. The inert gas purging may be carried out, for example, in advance before the power generation, or may be carried out in advance and also during the power generation, as in this example. It should be noted that the light-driven fuel cell of the present invention is not limited thereto. It is also possible that the light-driven fuel cell of the present invention is not provided with the means for introducing inert gas.

Furthermore, the light-driven fuel cell of the present invention may be provided with a light source capable of modifying the wavelength and intensity of light to be irradiated, and/or may be provided with a capacity of modifying the mixing ratio of methane and oxygen to be supplied to the cathode 11, and/or may be provided with a capacity of modifying the humidity of methane and oxygen to be supplied to the anode 12 and the cathode 11.

The operating temperature of the light-driven fuel cell of the present invention at the time of power generation is not particularly limited. Although the light-driven fuel cell can operate sufficiently even at room temperature, the light-driven fuel cell is preferably operated at a high temperature from the viewpoint of improving the oxidation rate of methane by the photocatalyst. The operating temperature is, for example, in the range of 5° C. to 95° C., preferably in the range of 10° C. to 90° C., more preferably in the range of 20° C. to 80° C., and particularly preferably in the range of 30° C. to 70° C.

Next, each component of the light-driven fuel cell according to the present invention will be explained.

<Cathode>

In the cathode of the light-driven fuel cell of the present invention, an aerobic methane oxidation reaction occurs depending on the irradiation of light. The "aerobic methane oxidation reaction" means an aerobic oxidation reaction of methane in the presence of oxygen.

Methane and oxygen supplied to the cathode may each be supplied in the form of a mixed gas diluted by argon gas, etc., and the methane concentration and the oxygen concentration in the mixed gas may be from 1% by volume to 10% by volume, preferably from 2% by volume to 8% by volume, respectively. The supply flow rate of the mixed gas may be, for example, 10 mL/min to 500 mL/min, or 50 mL/min to 200 mL/min. The mixed gas and argon gas are preferably humidified, and are preferably humidified for example by bubbling into ion-exchanged water at room temperature.

In the light-driven fuel cell of the present invention, the conditions for the aerobic methane oxidation reaction are preferably in the range of 0.1 atm to 50 atm, and the oxygen concentration is preferably in the range of 20% to 100%. The temperature of the said reaction is in the range of 5° C. to 95° C., preferably in the range of 10° C. to 90° C., more preferably in the range of 20° C. to 80° C., and particularly preferably in the range of 30° C. to 70° C.

In the light-driven fuel cell of the present invention, the wavelength of light irradiated to the cathode is preferably in the range of 500 nm or less. More preferably, it is in the range of 300 nm or less. The intensity of the light irradiated to the cathode is preferably in the range of 1 mW/cm$^2$ to 500 mW/cm$^2$, more preferably in the range of 1 mW/cm$^2$ to 200 mW/cm$^2$, and even more preferably in the range of 5 mW/cm$^2$ to 100 mW/cm$^2$.

In the light-driven fuel cell of the present invention, it is preferable that the cathode includes a Teflon (registered trademark) dispersion. By including a Teflon (registered trademark) dispersion in the cathode, the water repellency of the cathode can be improved, and it is possible to prevent the water generated at the cathode from inhibiting catalytic reaction, whereby the amount of catalyst can be saved, and as a result, the cost can be suppressed.

(Photocatalyst for Aerobic Methane Oxidation Reaction)

The cathode of the light-driven fuel cell of the present invention includes a photocatalyst for aerobic methane oxidation reaction.

A "photocatalyst for aerobic methane oxidation reaction" means a photocatalyst which can be excited by ultraviolet or visible light to oxidize methane aerobically and in a light-dependent manner in the presence of oxygen. In the photocatalyst for aerobic methane oxidation reaction, when light having an energy equal to or higher than a band gap of the photocatalyst is irradiated, electrons in the valence band are excited to the conduction band, and the photocatalyst can oxidize methane in the presence of oxygen. Incidentally, in the present invention, "ultraviolet light" means, for example, light having a wavelength in a range of 400 nm or less. Further, "visible light" means light having a wavelength in the range of 400 nm to 800 nm, for example.

The photocatalyst for aerobic methane oxidation reaction may comprise an organometallic complex. Examples of the organometallic complex comprised in the catalyst for aerobic methane oxidation reaction include an organometallic complex in which a ligand constituting the organometallic complex comprises pentamethylcyclopentadiene and a transition metal serving as a metal center in the organometallic complex is tetravalent ruthenium. One type of photocatalyst may be used alone, or two or more types thereof may be used in combination.

The photocatalyst for aerobic methane oxidation reaction may also be, for example, an organometallic complex thin film produced by the vapor deposition of an organometallic complex on a substrate. The organometallic complex thin film is particularly preferably produced by a sputtering method in atmosphere of an inert gas containing nitrogen, at a high temperature condition of a substrate temperature of 400° C. or higher (nitrogen substitution type). The inert gas containing nitrogen is preferably a mixed gas of nitrogen gas and argon gas. The mixing ratio of the mixed gas is not particularly limited. As for the mixing ratio (volume ratio, nitrogen gas/argon gas) of the mixed gas, for example, it is in the range of 0.02 to 0.7, preferably in the range of 0.03 to 0.6, and more preferably in the range of 0.05 to 0.3. In the above production method, it is preferable to further bake the (nitrogen substitution type) organometallic complex thin film. The baking temperature is, for example, 200° C. or higher, preferably in the range of 200° C. to 500° C., and more preferably in the range of 200° C. to 400° C.

Organometallic complex ML comprised in the photocatalyst for aerobic methane oxidation reaction can be usually produced by reacting M (metal) (more specifically, a metal salt) and L (ligand) in a solvent, according to a chemical reaction formula represented by the following formula (3):

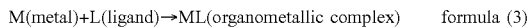

M(metal)+L(ligand)→ML(organometallic complex)     formula (3)

As the metal salt, chloride is preferred, but is not limited to chloride, and may be acetate, sulfate, etc. Preferable examples of the solvent include lower alcohols having 1 to 12 carbon atoms, such as methanol, ethanol, and propanol.

In addition, in order to abstract a hydrogen atom from an organic compound serving as a ligand, it is desirable to perform the reaction by adding an alkali in the lower alcohol as a solvent. As the alkali, for example, ammonia water, sodium carbonate, potassium carbonate, sodium hydroxide, potassium hydroxide, etc., can be used accordingly.

The solvent is preferably used, for example, in an amount of 1 to 1000 times by weight relative to the reactant. Further, it is preferable that the reaction temperature is, for example, a temperature around the boiling point of the reaction solvent to be used.

The pentamethylcyclopentadiene as a ligand can form a complex with, for example, Be, Mg, Sr, Mn, Zn, Co, Ni, Ru, Rh, Pd, Ir, Pt, Eu.

As a method for synthesizing pentamethylcyclopentadiene, for example, mention may be made of a method in which tiglic aldehyde (trans-2-methyl-2-butenal) is used as a starting material to obtain pentamethylcyclopentadiene, via a 2,3,4,5-tetramethyl-2-cyclopentenone. As another method, for example, mention may be made of a method in which an alcohol is formed by adding two molecules of 2-butenyllithium to ethyl acetate and performs dehydrocyclization of the alcohol by an acid catalyst.

It should be noted that pentamethylcyclopentadienyl has several advantages as a ligand. Specifically, pentamethylcyclopentadienyl is highly electron-donating and hardly separates from the metal because it is electron-rich. In addition, kinetic stability has been imparted to the complex due to steric hindrance of the methyl group, and as a result, unwanted polymerization and attack of undesired chemical species can be prevented, and, further, the solubility can be increased.

In particular, an organometallic complex, which has pentamethylcyclopentadiene as a ligand and ruthenium as a transition metal serving as a metal center, can be synthesized based on a known synthetic method described in, for example, P. J. Fagan, M. D. Ward, J. C. Calabrese, J. Am. Chem. Soc. 1989, 111, 1698. Specifically, for example, it can be produced according to the chemical reaction formula shown in the following formula (4):

[Chem 3]

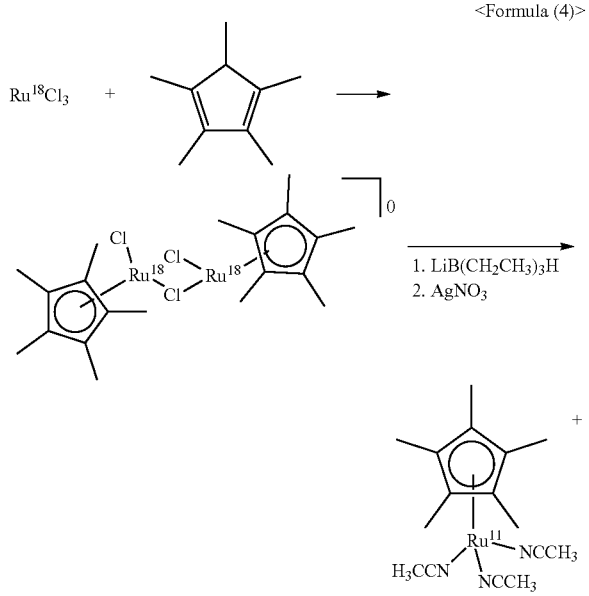

<Formula (4)>

Of course, as long as it can function as a "photocatalyst for aerobic methane oxidation reaction", the above specific compound can be modified by replacing a substituent and/or ligand in the above specific compound with another substituent and/or ligand, based on conventional known synthetic methods.

(Cathode Photoelectrode)

The cathode of the light-driven fuel cell according to the present invention may have a cathode photoelectrode comprising a photocatalyst for aerobic methane oxidation reaction. The cathode photoelectrode may be a composite of electrode material and organometallic complex.

The electrode material constituting the composite of electrode material and organometallic complex may be a known material used for a cathode electrode, and may be, for example, carbon. The shape of the electrode material is not particularly limited, but may be, for example, in the form of a film or a sheet, and may be in the form of a mesh or a paper.

Examples of the organometallic complex constituting the composite of electrode material and organometallic complex include the above-mentioned organometallic complexes comprised in the photocatalyst for aerobic methane oxidation reaction.

Methods for preparing the composite of electrode material and organometallic complex is not particularly limited. For example, an electrode material may be immersed in a solution of an organometallic complex dissolved in an organic solvent and dried, in order to obtain a composite of electrode material and organometallic complex in which an organometallic complex is adhered to the surface of the electrode material.

Preferably, in the composite of electrode material and organometallic complex, a ligand constituting the organometallic complex is bonded to the electrode material.

Specific embodiments of the bond between the electrode material and the ligand are not particularly limited, and examples thereof include an embodiment in which the electrode material and the ligand are covalently bonded, and an embodiment in which the ligand is simply adsorbed onto the electrode material.

The amount of the ligand introduced into the electrode material is not particularly limited, but is usually from 0.01 mol % to 100 mol %, preferably from 0.1 mol % to 10 mol %, and more preferably from 3 mol % to 10 mol %, per 1 mol of the OH group on the surface of the electrode material. Alternatively, the amount of the ligand introduced into the electrode material is usually from $1\times10^{-4}$ mol to $1\times10^{-6}$ mol, preferably from $1\times10^{-4}$ mol to $1\times10^{-5}$ mol, and more preferably from $5\times10^{-5}$ mol to $9\times10^{-5}$ mol, per unit surface area ($m^2$) of the electrode material.

The electrode material may be hydrophobic or may be hydrophilic. When the electrode material is hydrophobic, the electrode material itself can form a hydrophobic field around the complex. On the other hand, when the electrode material is hydrophilic, a hydrophobic field can be formed around the complex by bonding a hydrophobic group to the electrode material or to the ligand.

The step of introducing the hydrophobic group into the hydrophilic electrode material may be performed at any stage. For example, the hydrophobic group may be introduced during or after the production of the composite, or a composite may be prepared using an electrode material in which a hydrophobic group has been introduced in advance. When the hydrophobic group is introduced during the course of preparing a composite, for example, a hydrophobic group can be introduced after a ligand is introduced into an electrode material and before a metal center is introduced.

As a method for introducing a hydrophobic group into a hydrophilic electrode material, for example, mention may be made of a method in which an electrode material having a hydroxy group is reacted with a silane compound, such as alkoxysilane or silane halide, acid halide, phenol, ester, or alcohol.

In order to react the hydroxy group on the surface of the electrode material with a silane compound, acid halide, phenol, ester, or alcohol, etc., these may be left in a solvent such as toluene, benzene, dichloromethane, or chloroform. Further, if necessary, they may be stirred. The reaction temperature is not particularly limited, and may usually be 50° C. to 300° C., preferably 100° C. to 250° C. The reaction time is not particularly limited, but is usually 1 hour to 100 hours, preferably 10 hours to 50 hours. The reaction pressure is not particularly limited, but the reaction pressure is usually 0.1 MPa to 10 MPa, preferably 1 MPa to 3 MPa.

The composite formed from an electrode material and an organometallic complex can be prepared, for example, by a method in which an electrode material, a ligand, and a metal source are mixed at a time, or by a method in which each of these components is mixed in an arbitrary order. As for an order of mixing each component, for example, mention may be made of (1) a method in which a ligand and an electrode material are mixed first, and then a metal center is introduced; and (2) a method in which a complex is generated first using a ligand and a metal source and then the obtained complex and an electrode material are mixed.

Methods for bonding an electrode material and a ligand can be selected depending on the type of the electrode material used, etc. For example, mention may be made of an exemplary method in which an electrode material having adsorption property such as activated carbon is mixed with a ligand in order to adsorb the ligand on the electrode material. Alternatively, as a method of covalently bonding an electrode material and a ligand, mention may be made of an exemplary method in which an electrode material having a hydroxy group and a ligand precursor having an alkoxysilane site are used in order to react the hydroxy group with the alkoxysilane site.

In order to react a hydroxy group on the surface of an electrode material with a ligand precursor, these may be left in a solvent, etc. Further, if necessary, they may be stirred. The reaction temperature is not particularly limited, and may be usually 50° C. to 200° C., preferably 100° C. to 150° C. The reaction time is not particularly limited, but is usually 1 hour to 50 hours, preferably 10 hours to 30 hours. The solvent is not particularly limited, and examples thereof include nitriles such as acetonitrile and benzonitrile; and lower alcohols such as methane and ethanol.

The introduction of a metal center can be performed, for example, by a method in which a metal source is reacted with a ligand or a ligand bonded to an electrode material.

In order to introduce a metal center, a ligand or a ligand bonded to an electrode material and a metal source may be just left, and, if necessary, a solvent may be added and may be stirred. The reaction temperature is not particularly limited, and examples thereof usually include 0° C. to 100° C., preferably 10° C. to 50° C. The reaction time is not particularly limited, but is usually 1 hour to 50 hours, preferably 10 hours to 30 hours. The solvent is not particularly limited, and examples thereof include nitriles such as acetonitrile and benzonitrile; and lower alcohols such as methane and ethanol.

The shape of the cathode photoelectrode is not particularly limited. The shape of the cathode photoelectrode, for example, may have a shape of a pipe, may have a shape of a flat plate, may have a linear shape, or may have a shape of a rod. Preferably, the cathode photoelectrode is porous. If the cathode photoelectrode is porous, for example, a contact area between methane and oxygen can be increased, and an aerobic oxidation reaction at the cathode may be promoted. As a method of forming a porous cathode photoelectrode, mention may be made of, for example, a method in which a cathode photoelectrode is formed in a state in which a volatile substance is mixed in advance and then the volatile substance is evaporated by heating; a method of using a porous mold; a method of forming a pinhole with a needle, etc., after forming a cathode photoelectrode; a method of forming a cathode photoelectrode by performing a vapor deposition on a concavo-convex substrate; and a method of mixing a gas when a cathode photoelectrode is formed by the vapor deposition.

The cathode photoelectrode may include materials other than the photocatalyst for aerobic methane oxidation reaction, as long as they do not interfere with the irradiation of light required for the function of the photocatalyst.

<Anode>

In the anode of the light-driven fuel cell of the present invention, an anaerobic methane oxidation reaction occurs depending on light irradiation. In the present invention, "anaerobic methane oxidation reaction" means an anaerobic oxidation reaction of methane in the presence of water.

The methane supplied to the anode may be supplied in the form of mixed gas diluted by a gas, such as argon gas, and the concentration of methane in the mixed gas may be from 1% by volume to 10% by volume, preferably from 2% by volume to 8% by volume. The supply flow rate of the mixed gas may be, for example, 1 mL/min to 500 mL/min, or 10 mL/min to 100 mL/min.

Water can be supplied to the anode, for example, through humidification of the mixed gas and argon gas. Humidification can be carried out, for example, by bubbling the mixed gas in ion-exchanged water under the room temperature.

In the light-driven fuel cell of the present invention, it is preferable that the condition of the anaerobic methane oxidation reaction is, for example, in the range of 0.01 atm or less and/or in the oxygen concentration range of 10% or less. The oxygen concentration is more preferably in the range of 5% or less, particularly preferably 1% or less, or 0.1% or less. The reaction temperature is in the range of 5° C. to 95° C., preferably in the range of 10° C. to 90° C., more preferably in the range of 20° C. to 80° C., and particularly preferably in the range of 30° C. to 70° C. In the light-driven fuel cell of the present invention, the wavelength of the light irradiated to the anode is preferably in the range of, for example, 500 nm or less, and more preferably in the range of 300 nm or less. The intensity of light irradiated to the anode is preferably in the range of 1 mW/cm$^2$ to 500 mW/cm$^2$, more preferably in the range of 1 mW/cm$^2$ to 200 mW/cm$^2$, and even more preferably in the range of 5 mW/cm$^2$ to 100 mW/cm$^2$.

In the light-driven fuel cell of the present invention, it is preferable that the anode includes a Teflon (registered trademark) dispersion. By including Teflon (registered trademark) dispersion in the anode, the amount of catalyst can be reduced, and as a result, the cost can be suppressed.

It is preferable that the dissolved oxygen in methane supplied to the anode is removed or substantially removed.

(Photocatalyst for Anaerobic Methane Oxidation Reaction)

The anode of the light-driven fuel cell of the present invention comprises a photocatalyst for anaerobic methane oxidation reaction. In the present invention, "photocatalyst for anaerobic methane oxidation reaction" means a photocatalyst which can be excited by ultraviolet light or visible light to photocatalytically and anaerobically oxidize methane in the presence of water.

The photocatalyst for anaerobic methane oxidation reaction may comprise an organometallic complex. Examples of the organometallic complex include those in which a ligand constituting the organometallic complex contains pentamethylcyclopentadiene and a metal center in the organometallic complex is iridium, and those in which a ligand constituting the organometallic complex contains cyclopentadiene and a transition metal serving as a metal center in the organometallic complex is monovalent iron or monovalent manganese. One type of the photocatalyst may be used alone, or two or more types thereof may be used in combination.

The photocatalyst for anaerobic methane oxidation reaction may also be, for example, an organometallic complex thin film produced by vapor-depositing an organometallic complex on a substrate. It is particularly preferred that the organometallic complex thin film is a (nitrogen-substitution type) organometallic complex thin film produced by a sputtering method under the nitrogen-containing inert gas atmosphere and under the high temperature condition wherein the substrate temperature being 400° C. or higher. The nitrogen-containing inert gas is preferably a mixed gas of nitrogen gas and argon gas. The mixing ratio of the mixed gas is not particularly limited. The mixing ratio (volume ratio, nitrogen gas/argon gas) of the mixed gas is, for example, in the range of 0.02 to 0.7, preferably in the range of 0.03 to 0.6, and more preferably in the range of 0.05 to 0.3. In this production method, it is preferable that the (nitrogen-substitution type) organometallic complex thin film is further baked. The baking temperature is, for example, 200° C. or higher, preferably in the range of 200° C. to 500° C., and more preferably in the range of 200° C. to 400° C.

The organometallic complex ML as a photocatalyst for anaerobic methane oxidation reaction can be usually produced by reacting M (metal) (specifically, a metal salt) and L (ligand) in a solvent, according to the chemical reaction formula represented by the following formula (5).

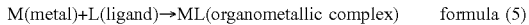

M(metal)+L(ligand)→ML(organometallic complex)   formula (5)

Although chloride is preferred as the metal salt, the metal salt is not limited to chloride, and may be acetate, sulfate, etc. Preferable examples of the solvent include lower alcohols having 1 to 12 carbon atoms, such as methanol, ethanol, and propanol.

Further, in order to abstract a hydrogen atom from an organic compound serving as a ligand, it is desirable to perform the reaction by adding, in a lower alcohol as a solvent, an alkali. As the alkali, for example, ammonia water, sodium carbonate, potassium carbonate, sodium hydroxide, potassium hydroxide, etc., can be used accordingly.

The amount of the solvent used is preferably 1 to 1000 times by weight relative to the reactant. Also, the reaction temperature is preferably a temperature around the boiling point of the solvent used.

The pentamethylcyclopentadiene as a ligand can form a complex with, for example, Be, Mg, Sr, Mn, Zn, Co, Ni, Ru, Rh, Pd, Ir, Pt, Eu.

As a method for synthesizing pentamethylcyclopentadiene, mention can be made of, for example, a method of starting from tiglic aldehyde (trans-2-methyl-2-butenal), via a 2,3,4,5-tetramethyl-2-cyclopentenone, to obtain pentamethylcyclopentadiene. As another method, mention may be made of, for example, a method of obtaining an alcohol by adding two molecules of 2-butenyllithium to ethyl acetate and performing dehydrocyclization of the alcohol by an acid catalyst.

Pentamethylcyclopentadienyl has several advantages as a ligand. In other words, since pentamethylcyclopentadienyl is electron-rich, it is highly electron-donating and is hardly separated from the metal. Further, since the kinetic stability is imparted to the complex due to steric hindrance of the methyl group, unwanted polymerization and undesired attack of chemical species can be prevented, and, further, the solubility is further increased.

For example, an organometallic complex having pentamethylcyclopentadiene as a ligand and iridium as a transition metal serving as a metal center can be produced according to the chemical reaction formula represented by the following chemical formula (6).

[Chem 4]

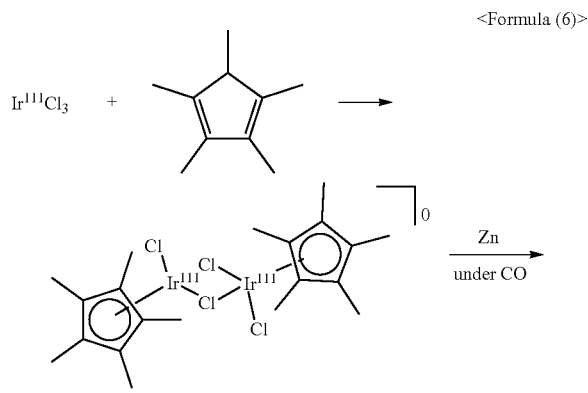

<Formula (6)>

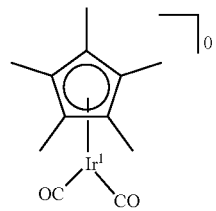

Further, an organometallic complex, which has cyclopentadiene as a ligand and monovalent iron or monovalent manganese as a transition metal serving as a metal center, can be synthesized based on known methods described in, for example, Kang, J. W.; Moseley, K.; Maitlis, P. M. J. Am. Chem. Soc. 1969, 91, 5970.

Of course, the above-mentioned specific compound can also be modified by replacing a substitute or ligand in the above-mentioned specific compound with another substituent or ligand based on a conventional known synthetic method, as long as it can function as a "photocatalyst for anaerobic methane oxidation reaction".

(Anode Photoelectrode)

The anode of the light-driven fuel cell according to the present invention may have an anode photoelectrode comprising a photocatalyst for anaerobic methane oxidation reaction. The anode photoelectrode may be a composite of electrode material and organometallic complex.

As an electrode material constituting the composite of electrode material and organometallic complex, a known material used for an anode electrode can be used. The electrode material may be titanium oxide. The shape of the electrode material is not particularly limited, but may have, for example, a shape of a film or a sheet, and may have a shape of a mesh or a shape of a paper.

Examples of the organometallic complex constituting the composite of electrode material and organometallic complex include the above-mentioned organometallic complexes comprised in the photocatalyst for anaerobic methane oxidation reaction.

Methods for preparing the composite of electrode material and organometallic complex is not particularly limited. For example, an electrode material may be immersed in a solution of an organometallic complex dissolved in an organic solvent and dried, in order to form a composite of electrode material and organometallic complex, in which the organometallic complex is adhered to the surface of the electrode material.

Embodiments for the bonding between the electrode material and the ligand of the organometallic complex in the composite of electrode material and organometallic complex is not particularly limited, and examples thereof include an embodiment in which the electrode material and the ligand are covalently bonded, and an embodiment in which the ligand is simply adsorbed onto the electrode material.

The amount of the ligand introduced into the electrode material is not particularly limited, and examples thereof normally include from 0.01 mol % to 100 mol %, preferably from 0.1 mol % to 10 mol %, and more preferably from 3 mol % to 10 mol %, per 1 mol of the OH group on the surface of the electrode material; Alternatively, examples thereof normally include from $1\times10^{-4}$ mol to $1\times10^{-6}$ mol, preferably from $1\times10^{-4}$ mol to $1\times10^{-5}$ mol, more preferably from $5\times10^{-5}$ mol to $9\times10^{-5}$ mol, per unit surface area (m$^2$) of the electrode material.

The electrode material may be hydrophobic or may be hydrophilic. When the electrode material is hydrophobic, the electrode material itself can form a hydrophobic field around the complex. On the other hand, when the electrode material is hydrophilic, a hydrophobic field can be formed around the complex, by bonding a hydrophobic group to the electrode material or to the ligand.

The step of introducing a hydrophobic group into a hydrophilic electrode material may be performed at any stage. For example, a hydrophobic group may be introduced during or after the production of a composite, or a composite may be prepared using an electrode material in which a hydrophobic group has been introduced in advance. When a hydrophobic group is introduced during the course of preparing of a composite, for example, a hydrophobic group can be introduced after the ligand has been introduced into the electrode material and before the metal center is introduced.

As an exemplary method of introducing a hydrophobic group into a hydrophilic electrode material, for example, mention may be made of a method of reacting an electrode material having a hydroxy group with a silane compound, such as alkoxysilane or halogenated silane, acid halide, phenol, ester, alcohol, etc.

In order to react the hydroxy group on the surface of the electrode material with a silane compound, acid halide, phenol, ester, alcohol, etc., they may be left in a solvent such as toluene, benzene, dichloromethane, or chloroform. Further, if necessary, they may be stirred. The reaction temperature is not particularly limited, and may be usually 50° C. to 300° C., preferably 100° C. to 250° C. The reaction time is not particularly limited, but is usually 1 hour to 100 hours, preferably 10 hours to 50 hours. The reaction pressure is not particularly limited, but the reaction pressure is usually 0.1 MPa to 10 MPa, preferably 1 MPa to 3 MPa.

A composite formed from an electrode material and an organometallic complex can be prepared, for example, by a method in which an electrode material, a ligand, and a metal source are mixed simultaneously, or by a method in which each of these components is mixed in an arbitrary order. With regard to the order of mixing each component, for example, mention may be made of (1) a method in which a ligand and an electrode material are mixed first, and then a metal center is introduced, and (2) a method in which a complex is generated first using a ligand and a metal source, and then the obtained complex and an electrode material are mixed.

Methods for bonding an electrode material and a ligand can be appropriately selected depending on, for example, the type of the electrode material used. For example, mention may be made of a method in which an electrode material having adsorption property, such as activated carbon, and a ligand are mixed, in order to adsorb the ligand onto the electrode material. Alternatively, as a method for covalently bonding an electrode material and a ligand, mention may be made of a method in which an electrode material having a hydroxy group and a ligand precursor having an alkoxysilane site are used to react the hydroxy group with the alkoxysilane site.

In order to react the hydroxy group on the surface of the electrode material with the ligand precursor, they may be left in a solvent, etc. Further, if necessary, they may be stirred. The reaction temperature is not particularly limited, and may be usually 50° C. to 200° C., preferably 100° C. to 150° C. The reaction time is not particularly limited, but is usually 1 hour to 50 hours, preferably 10 hours to 30 hours. The solvent is not particularly limited, and examples thereof include nitriles such as acetonitrile and benzonitrile; and lower alcohols such as methanol and ethanol.

The introduction of a metal center can be performed, for example, by a method in which a metal source is reacted with a ligand or a ligand bonded to an electrode material.

For the introduction of a metal center, a metal source and a ligand or a ligand bonded to an electrode material may be just left, and, if necessary, a solvent may be added and stirred. The reaction temperature is not particularly limited, and may be usually 0° C. to 100° C., preferably 10° C. to 50° C. The reaction time is not particularly limited, but is usually 1 hours to 50 hours, preferably 10 hours to 30 hours. The solvent is not particularly limited, and examples thereof include nitriles such as acetonitrile and benzonitrile; and lower alcohols such as methanol and ethanol.

The shape of the anode photoelectrode is not particularly limited. For example, the anode photoelectrode may have a shape of a pipe, may have a shape of a flat plate, may have a linear shape, or may have a shape of a rod. The anode photoelectrode is preferably porous. If the anode photoelectrode is porous, for example, the contact area of methane and water can be increased, and the anaerobic oxidation reaction at the anode can be promoted. As a method of forming the porous anode photoelectrode, for example, mention may be made of a method of forming an anode photoelectrode in a state in which a volatile substance is mixed in advance, and then evaporating the volatile substance by heating; a method of forming an anode photoelectrode using a porous mold; a method of forming a pinhole with a needle, etc., after the formation of an anode photoelectrode; a method of forming an anode photoelectrode by vapor deposition on a concavo-convex substrate; a method of mixing a gas when forming an anode photoelectrode by vapor deposition.

The anode photoelectrode may comprise materials other than the photocatalyst for anaerobic methane oxidation reaction, as long as they do not interfere with the irradiation of light which is required for the function of the photocatalyst.

<Light-Transmitting Substrate>

In a preferred embodiment of the present invention, the light-driven fuel cell has an anode-side light-transmitting substrate and a cathode-side light-transmitting substrate, wherein these substrates are at least partially light-transmitting. The anode is positioned between the anode-side light-transmitting substrate and the proton-permeable membrane and/or the cathode is positioned between the cathode-side light-transmitting substrate and the proton-permeable membrane.

Examples of the material for the light-transmitting substrate include glass and transparent plastic. Examples of glass include quartz glass, borosilicate glass, and soda-lime glass. Examples of the transparent plastic include acrylic resin, polycarbonate resin, polystyrene resin, rigid polyvinyl chloride and polyphenylene oxide.

In a preferred embodiment of the present disclosure,
(1) The cathode comprises a layer comprising a photocatalyst for aerobic methane oxidation reaction and a cathode-side gas diffusion layer,
(2) The anode comprises a layer comprising a photocatalyst for anaerobic methane oxidation reaction and an anode-side gas diffusion layer,
(3) The cathode-side gas diffusion layer is disposed facing the cathode-side light-transmitting substrate, the anode-side gas diffusion layer is disposed facing the anode-side light-transmitting substrate, the layer comprising the photocatalyst for aerobic methane oxidation reaction is disposed facing the cathode-side membrane surface of the proton-permeable membrane, and the layer comprising the photocatalyst for anaerobic methane oxidation reaction is disposed facing the anode-side membrane surface of the proton-permeable membrane.

(Gas Inlet/Product Outlet)

The light-driven fuel cell according to the present disclosure may be provided with a supply port (inlet) and a supply means for supplying methane and oxygen to the cathode. By this, it is possible to promote a redox reaction at the cathode in which methane and oxygen react with protons and electrons moved from the anode. As the means for supplying methane and oxygen, a known means can be used. For example, a gas tank which contains methane and a gas tank which contains oxygen can be connected to a gas supply port via connection pipes, and the amount of supplied fuel can be adjusted by, for example, a mass flow controller (MFC).

The light-driven fuel cell according to the present disclosure may be provided with a supply port (inlet) and a supply means for supplying methane and water to the anode. As the supply means for supplying methane and water, a known means can be used. For example, a gas tank which contains methane can be connected to a supply port for methane via a connection pipe having a humidifier, and the amount of supplied fuel can be adjusted by, for example, a mass flow controller (MFC).

(Means for Introducing Inert Gas)

The light-driven fuel cell according to the present disclosure is preferably provided with a means for introducing inert gas to the anode, whereby oxygen dissolved in methane can be further effectively removed.

Examples of the inert gas include nitrogen, helium, argon, krypton, methane, and ethane. Single type of the inert gas may be used alone, or two or more types thereof may be used in combination. Examples of the means for introducing inert gas include a bubble generator, a bubble injection nozzle, and a foam plate.

(Other Member)

The light-driven fuel cell according to the present disclosure may include other members, for example, a sealing member for hermetically sealing the anode and cathode, and a member having a supply port for gas and an outlet port for reaction product. The material constituting such members is not particularly limited, and any material can be used as long as it can form a desired shape. From the viewpoint of preventing the reduction of fuel such as methane, examples of a material for a member constituting the light-driven fuel cell according to the present disclosure include a laminate material in which a metal layer having low moisture permeability, such as aluminum, is coated with an insulating polymer, a polyvinylidene chloride resin, a fluorine-based resin, and a glass fiber-reinforced plastic material.

<Proton-Permeable Membrane>

The proton-permeable membrane is not limited as long as it is permeable to protons. Examples of a material forming the proton-permeable membrane include a polymer acid, an alumina hydrate, and a solid electrolyte. Of these, the polymer acid is particularly preferred.

Examples of the polymer acid include a condensation product of phenolsulfonic acid and formaldehyde, sulfonated polystyrene, trifluorostyrene sulfonic acid, a mixture of fluorocarbon sulfonic acid and polyvinylidene fluoride, and fluorocarbon sulfonic acid.

As the proton-permeable membrane, for example, a commercially available product can be used as it is. Examples of the commercially available product of the proton-permeable membrane include "Nafion (registered trademark)" manufactured by DuPont, "Flemion (registered trademark)" manufactured by AGC Inc. (Asahi Glass Co., Ltd.), and "Aciplex" (trade name) manufactured by Asahi Kasei Corporation.

The thickness of the proton-permeable membrane is not particularly limited. The thickness of the proton-permeable membrane is, for example, in the range of 20 μm to 300 μm, preferably in the range of 30 μm to 250 μm, and more preferably in the range of 50 μm to 200 μm.

<Fuel>

As previously noted, the fuel supplied to the anode includes methane and water. Further, as described above, the fuel supplied to the cathode includes methane and oxygen. In the present invention, "methane" is an organic compound serving as a fuel.

As described above, it is preferable that the oxygen dissolved in methane supplied to the anode is removed. This is because, when oxygen ($O_2$) is present in methane, for example, the photocatalyst may be used for oxidation of oxygen ($O_2$), resulting in the interference of oxidization of methane by the photocatalyst. It should be noted that "the dissolved oxygen is removed" means not only a state in which oxygen ($O_2$) in methane is completely removed, but also means a state in which it is substantially removed.

<Solvent>

The cathode and anode, in particular the cathode photoelectrode and anode photoelectrode, can, at least partially, directly come into contact with methane gas and/or, at least partially, come into contact with a solvent in which methane is dissolved.

When the cathode and anode, in particular the cathode photoelectrode and the anode photoelectrode, come into contact with a solvent in which methane is dissolved, methane dissolved in the solvent is oxidized to methanol at the cathode and anode. To prevent drying of the electrode, a solvent may be introduced into the cathode and/or anode together with methane gas. More specifically, the solvent in the form of a mist can be introduced to the cathode and/or anode together with methane gas.

The solvent is not particularly limited, and examples thereof include water, liquid ammonia, hydrogen peroxide, hydrogen fluoride, acetonitrile, methylene chloride, chloroform, carbon tetrachloride, 1,2-dichloroethane, benzene, chlorobenzene, dichlorobenzene, diethyl ether, tetrahydrofuran, and acetone.

In the solvent, an electrolyte may be dissolved. The electrolyte is not particularly limited and may be either acidic or basic. For example, the following materials can be used as an electrolyte: halides of alkali metals (sodium, potassium, etc.); halides of alkaline earth metals (magnesium, calcium, etc.); acids such as sulfuric acid, nitric acid, carbonic acid, and salts thereof (alkali metal salts, alkaline earth metal salts, etc.); tetrafluoroborate acid-n-butylammonium. The concentration of the electrolyte is not particularly limited, but is usually 0.01 M to 0.3 M, preferably 0.05 M to 0.2 M. In a case where a chloride of an alkali metal or alkaline earth metal is used as the electrolyte, a mechanism for recovering and reusing the generated chlorine gas may be installed in the light-driven fuel cell of the present invention. When a solvent in the form of a mist is introduced together with the methane gas, a solvent containing dissolved electrolyte may be introduced in the form of a mist. Further, the electrolyte membrane may be either acidic or basic.

(Light Source)

The light-driven fuel cell according to the present disclosure may have a light source for irradiating the anode and/or cathode with light. The light source is not particularly limited, but it is preferable to generate light having a wavelength of 500 nm or less, preferably 300 nm, and/or to irradiate the anodes and/or cathodes with light having the intensity of 0.5 mW/cm$^2$ to 500 mW/cm$^2$, preferably 1.0 mW/cm$^2$ to 200 mW/cm$^2$, particularly preferably 1.0 mW/cm$^2$ to 100 mW/cm$^2$.

From the viewpoint of effectively utilizing natural energy, sunlight is preferably used as the light source. It is also possible that the light source is, for example, an artificial light source capable of emitting light having energy equal to or greater than the band gap of the photocatalyst. The artificial light sources include, for example, a xenon lamp, a ultraviolet lamp, a mercury lamp (high pressure, ultrahigh pressure), an incandescent lamp, and a fluorescent lamp.

<External Circuit>

The external circuit is not particularly limited, and a conventionally known circuit can be used. The external circuit is connected to the cathode and anode, for example via electrically-conductive leads.

<Other Components>

The light-driven fuel cell of the present invention may include other components in addition to the aforementioned components.

<Manufacturing Method of the Light-Driven Fuel Cell>

The light-driven fuel cell of the present invention may be manufactured, for example, by assembling each of the above-mentioned components, and optionally other components as necessary, according to a conventionally known method.

The light-driven fuel cell of the present invention may also be manufactured according to the following method, by incorporating a membrane-electrode assembly into the reactor main body of the light-driven fuel cell.

Figure 5A:
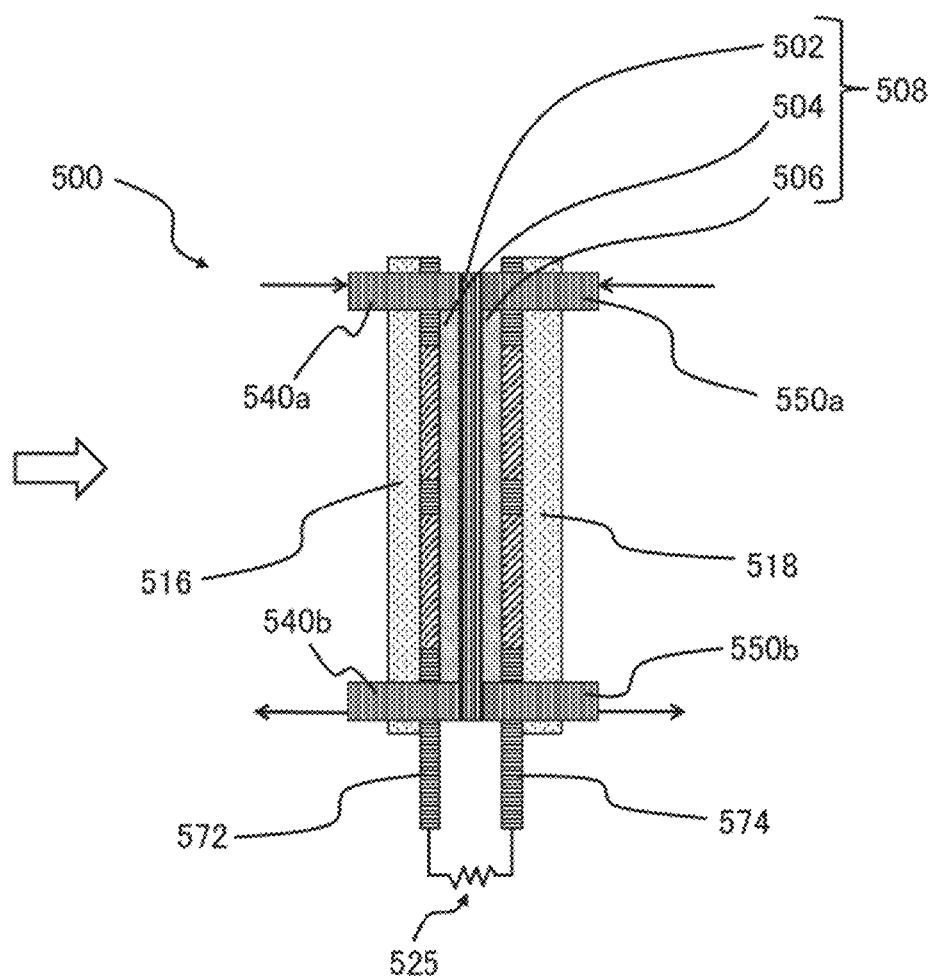
FIG. 5A is a schematic cross-sectional view showing a reactor main body of the light-driven fuel cell according to one embodiment of the present invention.
Figure 5B:
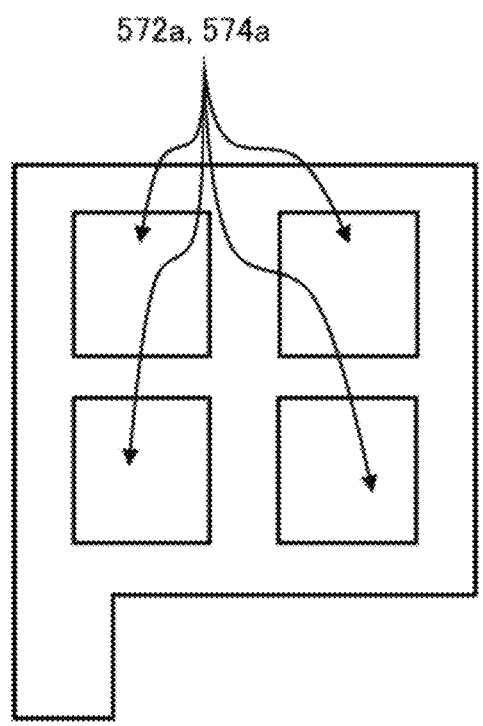
FIG. 5B is a schematic plan view of a current collector which is a component of the light-driven fuel cell according to an embodiment of the present invention.

FIGS. 5A and 5B are schematic cross-sectional views showing an embodiment of the reactor main body of the light-driven fuel cell of the present invention. The reactor main body 500 of the light-driven fuel cell shown in FIG. 5A includes a membrane-electrode assembly 508. The membrane-electrode assembly 508 includes a solid electrolyte membrane 502 as a proton-permeable membrane, an anode photoelectrode 504 provided on the solid electrolyte membrane 502, and a cathode photoelectrode 506 provided on a face of the solid electrolyte membrane 502 opposite to the anode photoelectrode 504. The anode photoelectrode 504 and the cathode photoelectrode 506 are electrically connected to each other.

The anode photoelectrode 504 is arranged adjacent to one surface of a first current collector plate (anode-side current collector plate) 572 which also functions as an anode-side gas diffusion layer, and is connected to an external circuit 525 via the first current collector plate 572. On the face of the first current collector plate 572 opposite to the anode photoelectrode 504, a quartz glass plate 516 as an anode-side light-transmitting substrate is provided.

The cathode photoelectrode 506 is disposed adjacent to one surface of a second current collector plate (cathode-side current collector plate) 574 which also functions as a cathode-side gas diffusion layer, and is connected to the external circuit 525 via the second current collector plate 574. On the face of the second current collector plate 574 opposite to the cathode photoelectrode 506, a quartz glass plate 518 as a cathode-side light-transmitting substrate is provided.

The main body 500 of the light-driven fuel cell further comprises members 540a and 550a having supply ports for raw material gas, and members 540b and 550b having outlet ports for guiding out generated hydrocarbons.

The first current collector plate 572 and/or the second current collector plate 574 may have a gas flow passage for achieving more uniform gas transport, and the gas flow passage may be, for example, a meandering groove.

The first current collector plate 572 and the second current collector plate 574 connect the anode photoelectrode 504 and the cathode photoelectrode 506 to the external circuit 525, respectively. The thickness of the first current collector plate 572 and the second current collector plate 574 may be, for example, 2 mm. When the anode photoelectrode 504 and the cathode photoelectrode 506 are connected via a current collector plate, they can be more reliably electrically connected, as compared with a case of direct connection with an electrical lead without using the current collector plates.

Materials for the first current collector plate 572 and the second current collector plate 574 are not particularly limited, and known materials can be used; for example, gold-plated copper can be used.

The current collector plate in FIG. 5A (the first current collector plate 572, the second current collector plate 574) is provided with openings for light-irradiation. FIG. 5B shows a plan view of the current collector plate (the first current collector plate 572, the second current collector plate 574). The view direction in the FIG. 5B is indicated by white arrows in the FIG. 5A. As can be seen in the FIG. 5B, the first current collector plate and the second current collector plate each have four square openings for light-irradiation (572a, 574a) each having a side length of 2 cm.

As described above, the membrane-electrode assembly can be incorporated into the reactor main body of the light-driven fuel cell, by bringing one surface of the first current collector plate having the openings into contact with the anode-side of the membrane-electrode assembly and further by covering the other surface of the first current collector plate with the quartz glass, and by bringing one surface of the second current collector plate having the openings into contact with the cathode side of the membrane-electrode assembly and further by covering the other surface of the second current collector plate with the quartz glass.

The reactor main body of the light-driven fuel cell thus manufactured has, for example, the following structure:

A structure in which:

(1) the cathode comprises a layer comprising a photocatalyst for aerobic methane oxidation reaction and a cathode-side gas diffusion layer, (2) the anode comprises a layer comprising a photocatalyst for anaerobic methane oxidation reaction and an anode-side gas diffusion layer, and (3) the cathode-side gas diffusion layer is arranged facing the cathode-side light-transmitting substrate, the anode-side gas diffusion layer is arranged facing the anode-side light-transmitting substrate, the layer comprising the photocatalyst for aerobic methane oxidation reaction is arranged facing the cathode-side membrane surface of the proton-permeable membrane, and the layer comprising the photocatalyst for anaerobic methane oxidation reaction is arranged facing the anode-side membrane surface of the proton-permeable membrane.

EXAMPLES

Hereinafter, examples of the present invention will be described. It should be noted that the present invention is not limited or restricted in any way by the following examples and comparative examples.

Examples

The light-driven fuel cell according to the present invention was manufactured as follows, and evaluations were conducted for power generation characteristics and methane conversion efficiency. The measurements of various properties and physical properties and the calculation of numerical values were carried out by the methods shown below.

<Preparation of Organometallic Complex Comprised in Photocatalyst for Anaerobic Methane Oxidation Reaction>

An organometallic complex (iridium complex), which is a photocatalyst for anaerobic methane oxidation reaction used in the anode, was synthesized as follows, based on a literature (Ball, R. G.; Graham, W. A. G.; Heinekey, D. M.; Hoyano, J. K.; McMaster, A. D.; Mattson, B. M.; S. T. Michel., Inorg. Chem. 1990, 29, 2023).

All operations were carried out under a nitrogen atmosphere. In 4.0 mL of dichloromethane, 0.0800 g (0.100 mmol) of (pentamethylcyclopentadienyl) iridium (III) dichloride (dimer) (commercially available, manufactured by Tokyo Chemical Industry Co., Ltd.) was dissolved. The resulting solution was stirred under a carbon monoxide atmosphere (0.3 MPa) for 2 hours, and then 0.40 g (6.12 mmol) of zinc was added.

Then, the resulting solution was stirred under a carbon monoxide atmosphere (0.3 MPa) for 16 hours, and then 3.0 mL of distilled water was added. Thereafter, the solution was stirred for 1 hours, and then filtered to collect the filtrate.

The dichloromethane layer separated from the recovered filtrate was washed three times with 1.0 mL of distilled water, and then dichloromethane was distilled off under reduced pressure to obtain an organometallic complex (Formula (7) below) as the target compound, in the form of yellow powder (yield: 0.0310 g, 0.0808 mmol, yield: 81%).

[Chem 5]

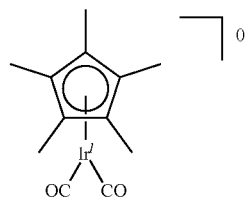

<Formula (7)>

Incidentally, the obtained organometallic complex was identified using conventional instrumental analytical methods such as $^1$HNMR, IR, X-ray crystallography to confirm that it is the desired material.

$^1$HNMR (ppm, CDCl$_3$):2. 2 (s, 15H, CH$_3$)

IR (cm$^{-1}$):2853-2915 (C—H), 2006 (C≡O), 1922 (C≡O)

Figure 6:
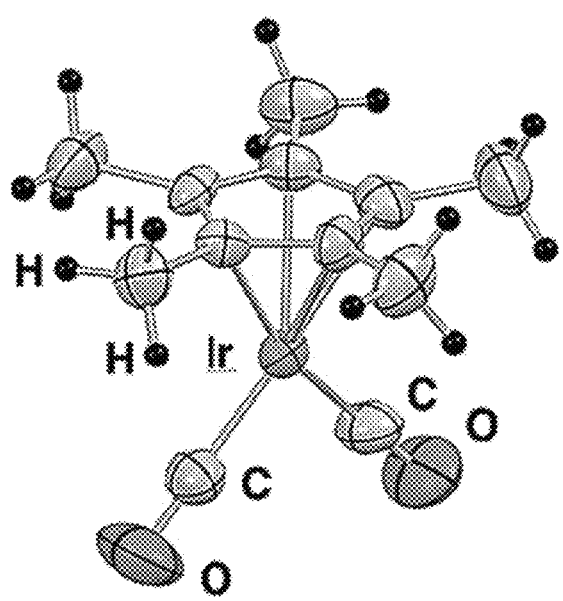
FIG. 6 shows the result of X-ray crystal structure analysis of an organometallic complex according to the example of the present invention.

X-ray Structural Analysis: see FIG. 6.

<Preparation of Organometallic Complex Comprised in Photocatalysts for Aerobic Methane Oxidation Reaction>

The organometallic complex (ruthenium complex), which is a photocatalyst for anaerobic methane oxidation reaction used for the cathode side, was synthesized as follows based on a document (P. J. Fagan, M. D. Ward, J. C. Calabrese, J. Am. Chem. Soc. 1989, 111, 1698).

All operations were carried out under a nitrogen atmosphere. A dark orange solution was obtained by adding 0.600 g (0.552 mmol) of tetrachlorotetrakis (pentamethylcyclopentadienyl) tetraruthenium, which is commercially available (Tokyo Chemical Industry Co., Ltd.), to 10 mL of acetonitrile and by heating under reflux at 90° C. for 1 hours.

The temperature of the resulting solution was lowered to the room temperature and 0.374 mg (2.20 mmol) of silver nitrate was added and then the resulting mixture was stirred for 1 hour to obtain a mixture comprising a white precipitate (white solid). The white-colored solid was removed by filtration from the resulting mixture, and the filtrate was collected. By passing the recovered filtrate through a gel filtration column and by removing the solvent from the obtained solution under reduced pressure, an organometallic complex (Formula (8) below) as the target compound was obtained in the form of yellow powder (yield: 0.765 g, 1.82 mmol, yield: 82%).

[Chem 6]

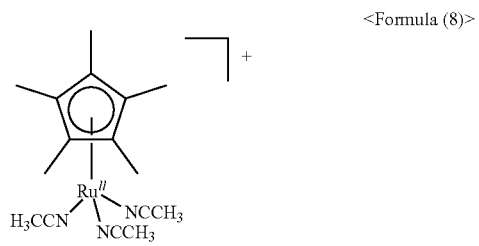

<Formula (8)>

The resulting organometallic complex was identified using conventional instrumental analytical methods such as $^1$HNMR, MS, IR, in order to confirm that it is the desired material.

$^1$HNMR (ppm, THF-d$_8$): 1.60 (s, 15H, CH$_3$), 2.37 (s, 9H, CH$_3$CN)

IR (cm$^{-1}$): 2845-3066 (C—H)

ESI-MS: m/z 360.

<Preparation of Anode Photoelectrode>

An electrode ("anode photoelectrode"), which consists of a titanium mesh as an electrode material and a layer comprising a photocatalyst for anaerobic methane oxidation reaction, was prepared as described below.

The titanium mesh (5 cm×5 cm) used was a plain weave type having φ 0.35 mm wire diameter and 20 mesh. The mesh was washed with an organic solvent and then dried. On the other hand, 5 mg of iridium complex as a photocatalyst for anaerobic methane oxidation reaction obtained as described above was dissolved in 3 ml of an organic solvent to obtain a solution of a photocatalyst for anaerobic methane oxidation reaction.

Then, the mesh after washing and drying described above was immersed in the above anode catalyst solution under the normal temperature and then dried. The immersion and drying steps were repeated three times to obtain an anode photoelectrode.

<Preparation of Cathode Photcatalyst>

An electrode (also referred to as a "cathode photoelectrode"), which consists of carbon paper as an electrode material and a layer comprising a photocatalyst for aerobic methane oxidation reaction, was prepared as follows.

As carbon paper (5 cm×5 cm), TGP-H-030 manufactured by Toray industries Inc., was used. On the other hand, 5 mg of ruthenium complex as a photocatalyst for aerobic methane oxidation reaction obtained as described above was dissolved in 3 ml of an organic solvent, in order to obtain a solution of a photocatalyst for aerobic methane oxidation reaction.

Then, the above-mentioned carbon paper was immersed in the above-mentioned solution of the photocatalyst for aerobic methane oxidation reaction under the normal temperature and then dried. The immersion and drying steps were repeated three times to obtain a cathode photoelectrode.

<Preparation of Membrane-Electrode Assembly>

On the titanium mesh obtained as described above, on which the photocatalyst for anaerobic methane oxidation reaction was attached, and on the carbon paper obtained as described above, on which the photocatalyst for aerobic methane oxidation reaction was attached, a solution obtained by diluting a sulfonic acid-modified perfluoro-ionomer (10 wt % of Nafion solution) with 10 ml of propanol was applied by spraying several times, respectively, and then dried.

Then, a laminate was obtained by inserting a Nafion film as a solid electrolyte membrane between the titanium mesh having the photocatalyst for anaerobic methane oxidation reaction and the carbon paper having the photocatalyst for aerobic methane oxidation reaction, so that the sprayed surfaces described above face each other.

Next, the obtained laminate was set in a press machine, and then pressed in a temperature range from the room temperature to 140° C., whereby a membrane-electrode assembly according to the Example was prepared.

<Manufacturing of Light-Driven Fuel Cell>

The membrane-electrode assembly thus prepared was used to produce a reactor main body of the light-driven fuel cell according to the example of the present invention, in accordance with the method described above with reference to FIGS. 5A and 5B.

Specifically, a first current collector plate, which was provided with four square openings for light irradiation having a side length of 2 cm, was provided, and one main surface of the first current collector plate was brought into contact with the anode-side main surface of the membrane-electrode assembly, and a quartz glass plate was arranged on the other main surface of the first current collector plate so as to cover it. Further, a second current collector plate, which was provided with four square openings for light irradiation having a side length of 2 cm, was provided, and one main surface of the second current collector plate was brought into contact with the cathode-side main surface of the membrane-electrode assembly, and a quartz glass plate was arranged on the other main surface of the second current collector plate so as to cover it. In addition, a member having a supply port for raw material gas and a member having an outlet port for reaction product were assembled.

As the first current collector plate and the second current collector plate, gold-plated copper was used. The thickness of each of the first current collector plate and the second current collector plate was 2 mm. The anode photoelectrode and the cathode photoelectrode were electrically connected via the current collector plates.

<Configuration of the Experimental Device>

Figure 7:
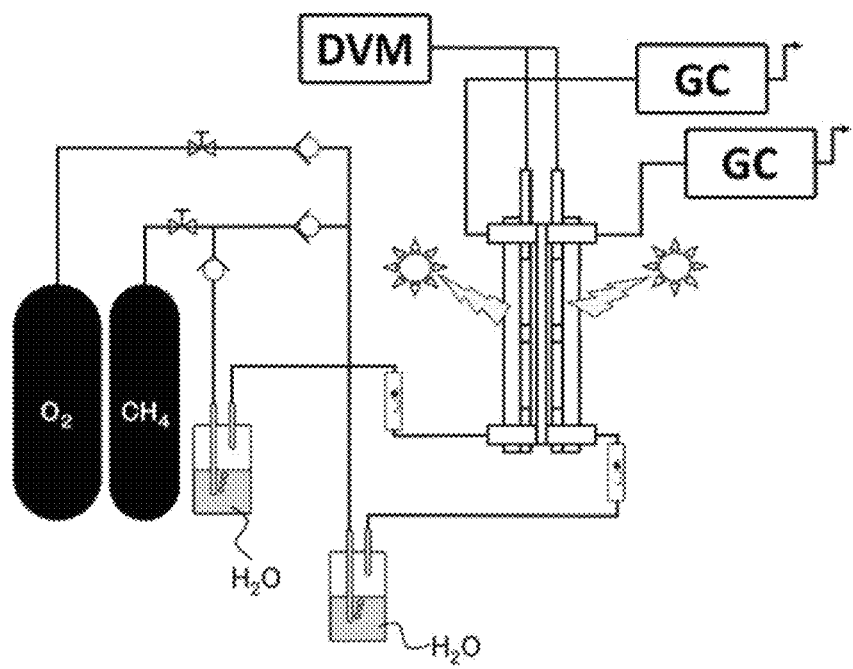
FIG. 7 is a diagram showing a measurement system according to the present invention.

FIG. 7 is a schematic diagram showing the configuration of the entire system including a means for supplying gas and a means for measurement.

The state of the reaction was observed by an electrochemical measurement system composed of a digital voltmeter (DVM), etc. In addition, gas components emitted from the anode and cathode, respectively, were quantitatively analyzed using a gas chromatograph (GC).

Short-circuit current density (JSC) and open-circuit voltage (VOC) were determined using linear sweep voltammetry (LSV) measurements. The LSV measurement was carried out by plotting the photocurrent value when the photovoltaic value generated at the time of light irradiation was shifted to 0V. From this result, the photocurrent flowing in the state of zero resistance was determined as short-circuit current density (JSC). Further, the photovoltaic power generated in the open circuit state (infinite resistance) was determined as the open-circuit voltage (VOC).

For light irradiation, xenon lamp (300 W, trade name "MAX-303" manufactured by Asahi Spectra Co., Ltd.) emitting light having wavelengths shorter than 300 nm was provided. A water filter was used to calibrate the xenon lamp so that light of about 100 mW/cm$^2$ is irradiated to the anode and cathode (i.e., the photocatalyst for anaerobic methane oxidation reaction and photocatalyst for aerobic methane oxidation reaction).

A mixed gas (corresponding to the raw material gas) was supplied to the anode at a flow rate of 20 mL/min, wherein the mixed gas was prepared by a dilution with argon gas so that the concentration of methane in the mixed gas was 5% by volume. The supplied mixed gas and argon gas were used after they were humidified by bubbling into ion-exchanged water at room temperature.

A mixed gas was supplied to the cathode at a flow rate of 100 mL/min, wherein the mixed gas was prepared by a dilution with argon gas so that the concentration of methane and the concentration of oxygen in the mixed gas were 5% by volume, respectively. The supplied mixed gas and argon gas were used after they were humidified by bubbling into ion-exchanged water at room temperature.

Each of the anode and cathode was irradiated with light at the intensity of 100 mW/cm$^2$ by the xenon lamp emitting light having wavelengths shorter than 300 nm, while supplying the above-described mixed gases to the cathode and anode of the light-driven fuel cell, in order to react methane.

The measurement procedures are as follows:

(0) Checking of Device and Environment
  An electrical measurement system and a gas analysis measurement system are prepared.
  A background voltage is measured.

(1) Measurement of Electromotive Force
  1-1. Gas is supplied. Voltage is measured. (0V)
  1-2. Light is irradiated while the supply of gas is maintained, and the electromotive force is measured. (~0.2V)
  1-3. The stability of the electromotive force is evaluated.
  1-4. The gas supply is stopped while light is irradiated. The electromotive force is measured. (~0V)
  1-5. Gas is supplied while light is irradiated. The electromotive force is measured.

(2) Measurement of Output Power
  Voltage and current curves are measured. The amount of electrical energy output is calculated. (0.061 mW)

(3) Analysis of Emitted Gas
  The amount of methanol and water in the anode gas and cathode gas are measured. (100 cc/min)
  The conversion amount of methane to methanol at the anode and cathode is calculated.

<Power Generation Properties>

Figure 8:
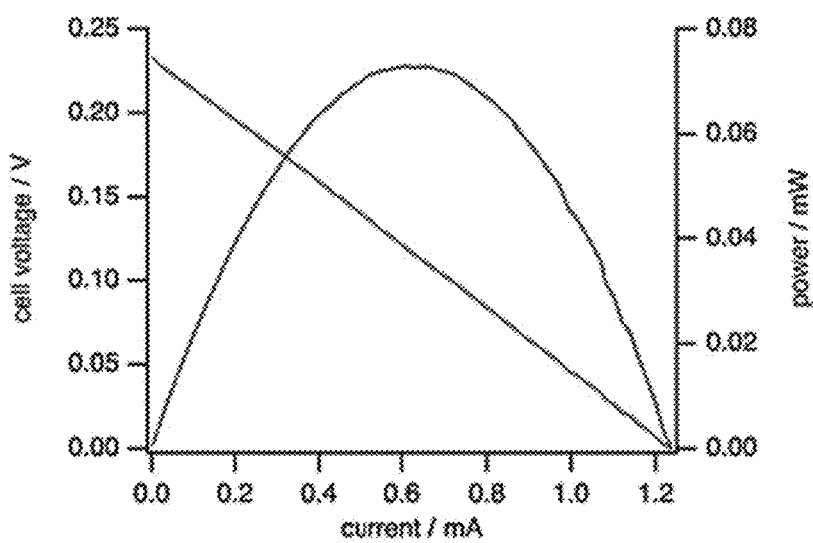
FIG. 8 is a graph showing the power generation performance of the example according to the present invention.

FIG. 8 is a diagram showing a current-voltage curve according to the example.

The evaluation results of the light-driven fuel cell according to the example obtained by the LSV measurement were VOC=0.23V, JSC=1.24 mA, and ff=0.21.

<Conversion Efficiency of Methane>

As a result of calculating the methane-methanol conversion amount at the anode and the cathode, it was confirmed that methane was converted into methanol at the anode and the cathode, respectively.

Specifically, with respect to the anode, it was confirmed that 0.01% of the amount of supplied methane was converted into methanol, and that it contained about 0.001% of ethane, etc. With regard to the cathode, it was confirmed that 0.01% of the amount of supplied methane was converted into methanol, and that it contained about 0.001% of ethane, etc.

INDUSTRIAL APPLICABILITY

As described above, the light-driven fuel cell of the present invention is excellent in power generation characteristics. The light-driven fuel cell of the present invention can generate electrical power by (1) the photocatalytical and anaerobic oxidation of methane in the presence of water, which is triggered by the irradiation of the anode with light, and (2) the photocatalytical and aerobic oxidation of methane in the presence of oxygen, which is triggered by the irradiation of the cathode with light. Therefore, the light-driven fuel cell of the present invention can be used in small electronic devices used in an environment in which light is irradiated, for example, in a form incorporated in a cellular phone, an electronic notebook, a notebook computer, etc. In addition, since methane is used as fuel, the light-driven fuel cell of the present invention can also be used as a fuel cell which generates electric power by effectively utilizing resources. However, the light-driven fuel cell of the present invention is not limited to the above-mentioned applications, and can be applied to a wide range of fields.

REFERENCE SIGNS LIST 10 light-driven fuel cell
11 cathode
12 anode
124 electrode material
126 photocatalyst
118 cathode reaction field
128 anode reaction field
14 proton-permeable membrane
15 external circuit
16 methane
17 water
18 oxygen
19 external line
500 reactor main body of the light-driven fuel cell
502 proton-permeable membrane (solid electrolyte membrane)
504 anode photoelectrode provided on proton-permeable membrane (solid electrolyte membrane)
506 cathode photoelectrode provided on proton-permeable membrane (solid electrolyte membrane)
508 membrane-electrode assembly
572 first current collector plate
516, 518 quartz glass plate
574 second current collector plate
540$a$ member having a supply port for raw material gas to supply raw material gas to anode
550$a$ member having a supply port for raw material gas to supply raw material gas to cathode
540$b$ member having an outlet port for guiding out hydrocarbons produced at anode
550$b$ member having an outlet port for guiding out hydrocarbons produced at cathode
572$a$ light transmitting part of the first current collector plate, for irradiating anode with light
574$a$ light transmitting part of the second current collector plate, for irradiating cathode with light

The invention claimed is:

1. A light-driven fuel cell comprising a cathode, an anode, and a proton-permeable membrane between the cathode and the anode,
    wherein the anode comprises a photocatalyst for anaerobic methane oxidation reaction, and when the anode is supplied with methane and water and is irradiated with light, methanol, protons and electrons are generated by anaerobic methane oxidation reaction from the methane and the water supplied to the anode; the protons pass through the proton-permeable membrane and move to the cathode; and the electrons move to the cathode via an external circuit,
    and wherein the cathode comprises a photocatalyst for aerobic methane oxidation reaction, and when the cathode is supplied with methane and oxygen and is irradiated with light, methanol and water are generated by aerobic methane oxidation reaction from the methane and the oxygen supplied to the cathode and the protons and the electrons moved from the anode.

2. The light-driven fuel cell according to claim 1, wherein the photocatalyst for anaerobic methane oxidation reaction comprises an organometallic complex.

3. The light-driven fuel cell according to claim 2, wherein the organometallic complex comprised in the photocatalyst for anaerobic methane oxidation reaction has pentamethylcyclopentadiene as a ligand and iridium as a metal center.

4. The light-driven fuel cell according to claim 2, wherein the organometallic complex comprised in the photocatalyst for anaerobic methane oxidation reaction has cyclopentadiene as a ligand and manganese or iron as a metal center.

5. The light-driven fuel cell according to claim 1, wherein the photocatalyst for aerobic methane oxidation reaction comprises an organometallic complex.

6. The light-driven fuel cell according to claim 5, wherein the organometallic complex comprised in the photocatalyst for aerobic methane oxidation reaction has pentamethylcyclopentadiene as a ligand and ruthenium as a metal center.

7. The light-driven fuel cell according to claim 1, comprising an anode-side light-transmitting substrate and a cathode-side light-transmitting substrate which are at least partially permeable to light, wherein
    the anode is situated between the anode-side light-transmitting substrate and the proton-permeable membrane, and/or the cathode is situated between the cathode-side light-transmitting substrate and the proton-permeable membrane.

8. The light-driven fuel cell according to claim 7, wherein
    (1) the cathode comprises a layer comprising the photocatalyst for aerobic methane oxidation reaction and a cathode-side gas diffusion layer,
    (2) the anode comprises a layer comprising the photocatalyst for anaerobic methane oxidation reaction and an anode-side gas diffusion layer,
    (3) the cathode-side gas diffusion layer is arranged facing the cathode-side light-transmitting substrate, the anode-side gas diffusion layer is arranged facing the anode-side light-transmitting substrate, the layer comprising the photocatalyst for aerobic methane oxidation reaction is arranged facing a cathode-side membrane face of the proton-permeable membrane, and the layer comprising the photocatalyst for anaerobic methane oxidation reaction is arranged facing an anode-side membrane face of the proton-permeable membrane.

* * * * *